(12) United States Patent
Omer et al.

(10) Patent No.: US 12,511,250 B2
(45) Date of Patent: Dec. 30, 2025

(54) HARDWARE-SOFTWARE CO-DESIGNED MULTI-CAST FOR IN-MEMORY COMPUTING ARCHITECTURES

(71) Applicant: INTEL CORPORATION, Santa Clara, CA (US)

(72) Inventors: Om Ji Omer, Bangalore (IN); Gurpreet Singh Kalsi, Bangalore (IN); Anirud Thyagharajan, Karnataka (IN); Saurabh Jain, Bangalore (IN); Kamlesh R. Pillai, Gujarat (IN); Sreenivas Subramoney, Bangalore (IN); Avishaii Abuhatzera, Amir (IL)

(73) Assignee: Intel Corporation, Santa Clara, CA (US)

( * ) Notice: Subject to any disclaimer, the term of this patent is extended or adjusted under 35 U.S.C. 154(b) by 730 days.

(21) Appl. No.: 17/561,029

(22) Filed: Dec. 23, 2021

(65) Prior Publication Data
US 2022/0113974 A1    Apr. 14, 2022

(30) Foreign Application Priority Data
Oct. 29, 2021 (IN) .............................. 202141049674

(51) Int. Cl.
*G06F 15/78* (2006.01)
(52) U.S. Cl.
CPC ................................ *G06F 15/7821* (2013.01)
(58) Field of Classification Search
CPC ...................... G06F 15/7821; G06F 15/17318
See application file for complete search history.

(56) References Cited

U.S. PATENT DOCUMENTS

| | | | | |
|---|---|---|---|---|
| 12,189,569 | B1* | 1/2025 | Xu | G06F 15/17318 |
| 2009/0125685 | A1* | 5/2009 | Bayer | G06F 13/4247 |
| | | | | 711/149 |
| 2017/0336989 | A1* | 11/2017 | Zawodny | G11C 29/28 |
| 2018/0314663 | A1* | 11/2018 | Nishimoto | G06F 13/1642 |
| 2019/0272121 | A1* | 9/2019 | Khan | G06F 3/0673 |

(Continued)

OTHER PUBLICATIONS

Chen, Y., et al., "Eyeriss v2: A Flexible Accelerator for Emerging Deep Neural Networks on Mobile Devices," IEEE; pp 1-21 (May 20, 2019).

(Continued)

*Primary Examiner* — Keith E Vicary
(74) *Attorney, Agent, or Firm* — Akona IP PC

(57) ABSTRACT

A memory architecture includes processing circuits co-located with memory subarrays for performing computations within the memory architecture. The memory architecture includes a plurality of decoders in hierarchical levels that include a multicast capability for distributing data or compute operations to individual subarrays. The multicast may be configurable with respect to individual fan-outs at each hierarchical level. A computation workflow may be organized into a compute supertile representing one or more "supertiles" of input data to be processed in the compute supertile. The individual data tiles of the input data supertile may be used by multiple compute tiles executed by the processing circuits of the subarrays, and the data tiles multicast to the respective processing circuits for efficient data loading and parallel computation.

8 Claims, 21 Drawing Sheets

(56) References Cited

U.S. PATENT DOCUMENTS

2021/0208801 A1* 7/2021 Song .................... G06F 3/0604

OTHER PUBLICATIONS

Eckert, C., et al., "Neural Cache: Bit-Serial In-Cache Acceleration of Deep Neural Networks," ACM/IEEE 45th Annual International Symposium on Computer Architecture; pp. 383-396 (2018).
Firuzan, A., et al., "Reconfigurable Network-on-Chip for 3D Neural Network Accelerators," Special Session Paper; IEEE; 8 pages (2018).
Fujuki, D., et al., "Duality Cache for Data Parallel Acceleration," ISCA; Phoenix, AZ; 14 pages (Jun. 22-26, 2019).
Gwennap., L., "Graphcore Makes Big AI Splash," The Linley Group, Microprocessor Report; pp. 1-6 (Sep. 17, 2018).
Gwennap., L., "GROQ Rocks Neural Networks," The Linley Group, Microprocessor Report; pp. 1-5 (Jan. 6, 2020).
Jani., A., "Mythic Unveils Analog-AI Product," The Linley Group, The Microprocessor Report; pp. 1-4 (Nov. 30, 2020).
Yasoubi, A., et al., "CuPAN—High Throughput On-chip Interconnection for Neural Networks," Springer International Publishing Switzerland; ICONIP 2015, Part III, LNCS 9491; pp. 559-566 (2015).

\* cited by examiner

```
def find_tile_loop_order (layer, I_chunks, Ic_chunks, Oc_chunks, sa_size):
    '''
    • Divides layer dimensions into various work chunks
    • An individual work chunk can fit only partly onto local memory. Find
      the loop order and tile size of such a workchunk that can fit,
      optimizing off chip data accesses.
      Returns the optimal loop order and tile.
    '''
    (wd, ht) = divide    (((layer.width, layer.height), I_chunks)
              (layer_sa.width, layer_sa.height) = (wd, ht)
    layer_sa.Ic = layer.Ic / Ic_chunks
    layer_sa.Oc = layer.Oc / Oc_chunks tile, loop_order = search_opt_tile (layer_sa, sa_size)
    return tile, loop_order
```

FIG. 8B

```
def find_div_factors (tile, fan_outs, I_chunks, Ic_chunks, Oc_chunks):
    '''
    For a single hierarchy level, find
        the optimal multicast factors (div_I, div_Ic, div_Oc) along (I, Ic,
    Oc) such that div_I * div_Ic * div_Oc = fan_outs
        These factors optimise reuse of the datatypes along the links
    '''
    ifm_size = tile.ifm_size()
    wt_size = tile.wt_sze()

A   =get_gcf  ((I_chunks * Oc_chunks), fan_outs)
    div_Ic = fan_outs / A if (I_chunks * Oc_chunks) == A:
        div_I = I_chunks
        div_Oc = Oc_chunks
        div_Ic = (A / (I_chunks * Oc_chunks)) * div_Ic
    else:
        ratio = (weight_size * Oc_chunks) / (ifm_size * I_chunks)
        div_I, div_Oc = solve_factors (A, ratio, I_chunks, Oc_chunks)

return div_I, div_Ic, div_oc
```

FIG. 8C

```
def solve_factors(prod, ratio, max_fac_A, max_fac_B):
    '''
    Given fac_A * fac_B = prod
    Minimize fac_A * r_A + fac_B * r_B,
    where r_A / r_B = ratio
    for prod, fac_A, fac_B being integers
    '''
    found = False
    prev_ratio = MAX
    for fac in get_factors_N(prod, N=2):
        fac_ratio = fac[0] / fac[1]
        if fac_ratio <= ratio:
            if prev_ratio == MAX:
                (fac_B, fac_A) = fac
            else:
                geomean = math.sqrt(fac_ratio * prev_ratio)
                if geomean < ratio:
                    (fac_B, fac_A) = prev_fac
                else:
                    (fac_B, fac_A) = fac
            found = True
            break
        else:
            prev_fac, prev_ratio = (fac, fac_ratio)

if not found:
        (fac_B, fac_A) = fac if max_fac_A % fac_A != 0:
        gcf = get_gcf(max_fac_A, fac_A)
        fac_B = fac_B * (fac_A / gcf)
        fac_A = gcf
    if max_fac_B % fac_B != 0:
        gcf = get_gcf(max_fac_B, fac_B)
        fac_A = fac_A * (fac_B / gcf)
        fac_B = gcf return (fac_A, fac_B)
```

FIG. 8D

```
def update_chunks( chunks, div ) :
    Recursive update equation that determines left over
    chunks for the next inner hierarchy level I_chunks, Ic_chunks, Oc_chunks = chunks
    div_I, div_Ic, div_Oc = div
    I_chunks = I_chunks / div_I
    Ic_chunks = Ic_chunks / div_Ic
    Oc_chunks = Oc_chunks / div_Oc
    ...
```

FIG. 8E

HARDWARE-SOFTWARE CO-DESIGNED MULTI-CAST FOR IN-MEMORY COMPUTING ARCHITECTURES

CROSS-REFERENCE TO RELATED APPLICATIONS

The present application claims priority to Indian Provisional Patent Application No. 202141049674, filed on Oct. 29, 2021, the contents of which are hereby incorporated by reference in its entirety.

TECHNICAL FIELD

This disclosure relates generally to in-memory computing architectures and particularly to such architectures with multi-cast capability.

BACKGROUND

Processors may include large on-chip memories (e.g., static random access memory (SRAM)) to reduce data accesses to off-die memory or other storage devices. These on-chip memories may be built using smaller memory cells in a hierarchical manner (e.g., memory banks, sub-banks, and arrays). To improve processing and execution speeds for parallelizable complex processing tasks, such as computer modeling, matrix processing, multiply-and-accumulate functions, among others, computing elements (e.g., processing units) may be deployed in or near memory to reduce data movement costs and achieve higher performance and data efficiency. Placing compute in or very near to memory cells provides the potential for parallelizing data-accesses during a compute-phase. But providing relevant input data to a large number of memory cells for highly concurrent in-memory computing poses significant challenges leading to latency overhead and overall efficiency loss that can make such potential solutions unattractive.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 8A-E shows a flowchart and example pseudocode for optimizing and selecting a dataflow for a memory architecture with co-located processing circuits.

DETAILED DESCRIPTION

Overview

Figure 1:
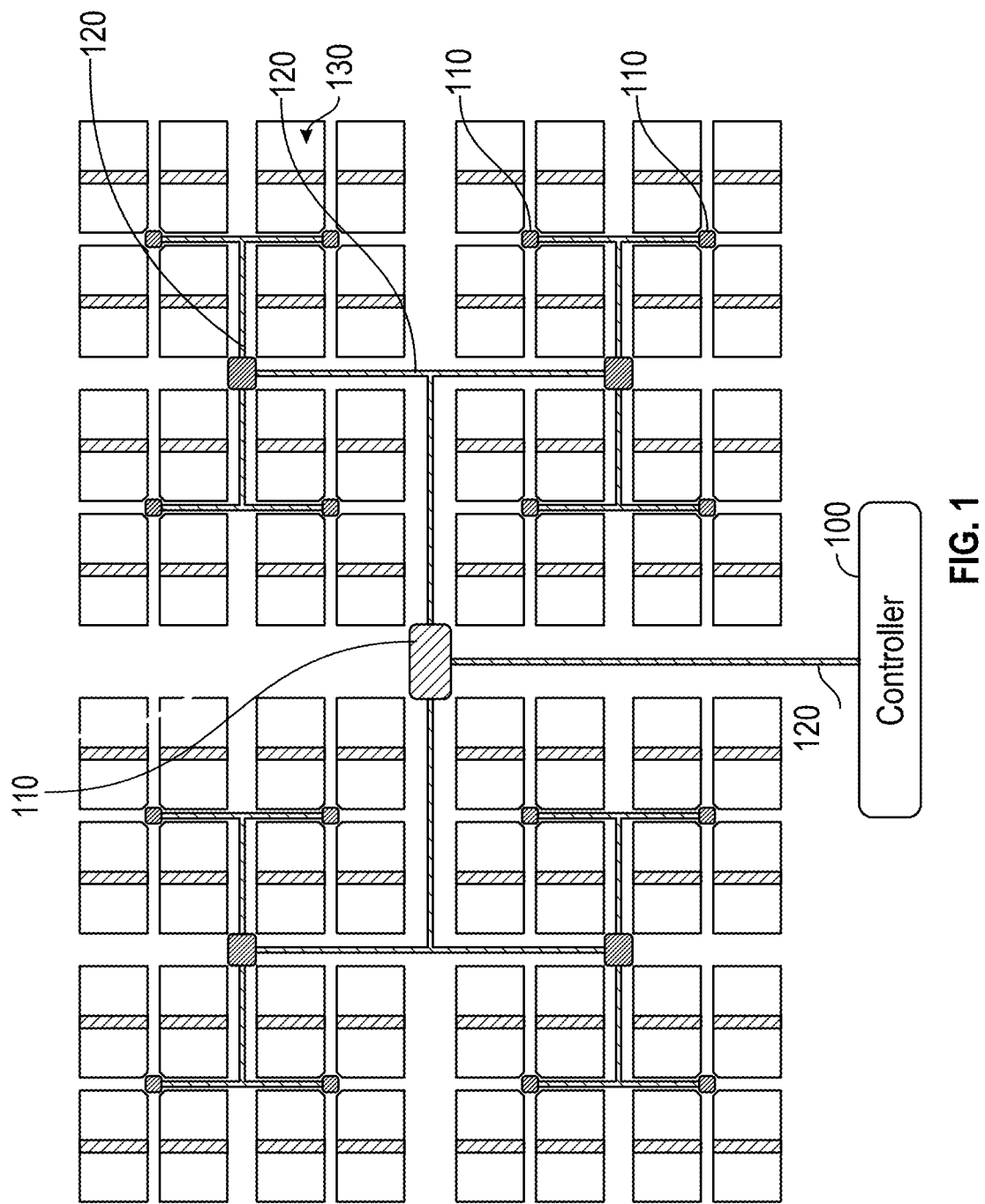
FIG. 1 shows an example hierarchical memory architecture.

The systems, methods and devices of this disclosure each have several innovative aspects, no single one of which is solely responsible for all desirable attributes disclosed herein. Details of one or more implementations of the subject matter described in this specification are set forth in the description below and the accompanying drawings.

To improve performance of such memories and provide more effective parallelization of computation, a multicast capability in memory architectures is disclosed along with dataflow strategies to exploit reuse opportunities across various parallelizable workloads, such as those used in computer modeling or artificial intelligence approaches. Other algorithms that use or process repetitive (e.g., reused) or parallelizable data may also benefit from these approaches, such as data comparison (e.g., string comparisons) or matrix/tensor processing operations.

A memory circuit is hierarchically organized and includes memory cells organized into subarrays that include one or more memory cells and a co-located compute architecture in the sub-array (e.g., compute-in (CiM) or near-memory (CnM)). The memories are addressable with a multicast capability that may be used to distribute commands to multiple subarrays. To provide the multicast capability, the microarchitecture for the hierarchical memory includes decoders that may support multicast capability with multicast addressing bits and may include a multicast bit designating whether to activate the multicast functionality. The multicast addressing bits may designate individual multicast addressing for which memory cells to receive multicast information. By providing for fine-grained multi-cast capability for data and compute operations within the memory, the compute-in/near-memory may process associated memory elements and enable highly concurrent processing, such as for AI computing tasks. In addition, the present disclosure provides an architecture-aware compiler framework to determine an optimal dataflow for various workloads and effectively use the multicast and parallel compute capability.

These approaches provide several advantages. First, using the multicast capability may parallelize multiple-destination data movement and reduce data transfer time and improve energy efficiency. In addition, the architecture-aware compiler framework enables a seamless mapping of parallelizable workloads to any given memory architecture with spatially distributed in-memory compute capability.

For purposes of explanation, specific numbers, materials, and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

In the following detailed description, reference is made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. The meaning of "a," "an," and "the" include plural references. The meaning of "in" includes "in" and "on."

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. The accompanying drawings are not necessarily drawn to scale. The terms "substantially," "close," "approximately," "near," and "about," generally refer to being within +/−20% of a target value. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

Multicast Memory with Co-Located Compute

FIG. 1 shows an example hierarchical memory architecture. Memories are usually built using many memory cells grouped hierarchically. For example, individual memory cells or sub-arrays are grouped into sub-banks, which are grouped into memory banks. In the example of FIG. 1, the memory cells are SRAM memory cells 130, although in other embodiments, other types of memory may also be used. To access individual memory cells, interconnect wires 120 and decoders 110 at each hierarchical stage may hierarchically route information to memory cells as shown in FIG. 1. Interconnect wires 120 carry an address and data bus and may include additional side-band signals (such as command opcode, byte enables, and request id). The decoder 110 at each hierarchy level decodes required bits on the address bus and accordingly routes the memory access request to the next inner level of hierarchy. The number of hierarchy levels and fan-outs at each hierarchy are chosen as per the architecture and design requirements. In typical memory access systems, the controller 100 individually accesses memory cells to read or write data by providing the address of a specific memory cell as specified by the addressing bits. The request addressing a particular memory traverses the hierarchical decoders in sequence (i.e., down the hierarchy) to access the addressable memory.

Figure 2:
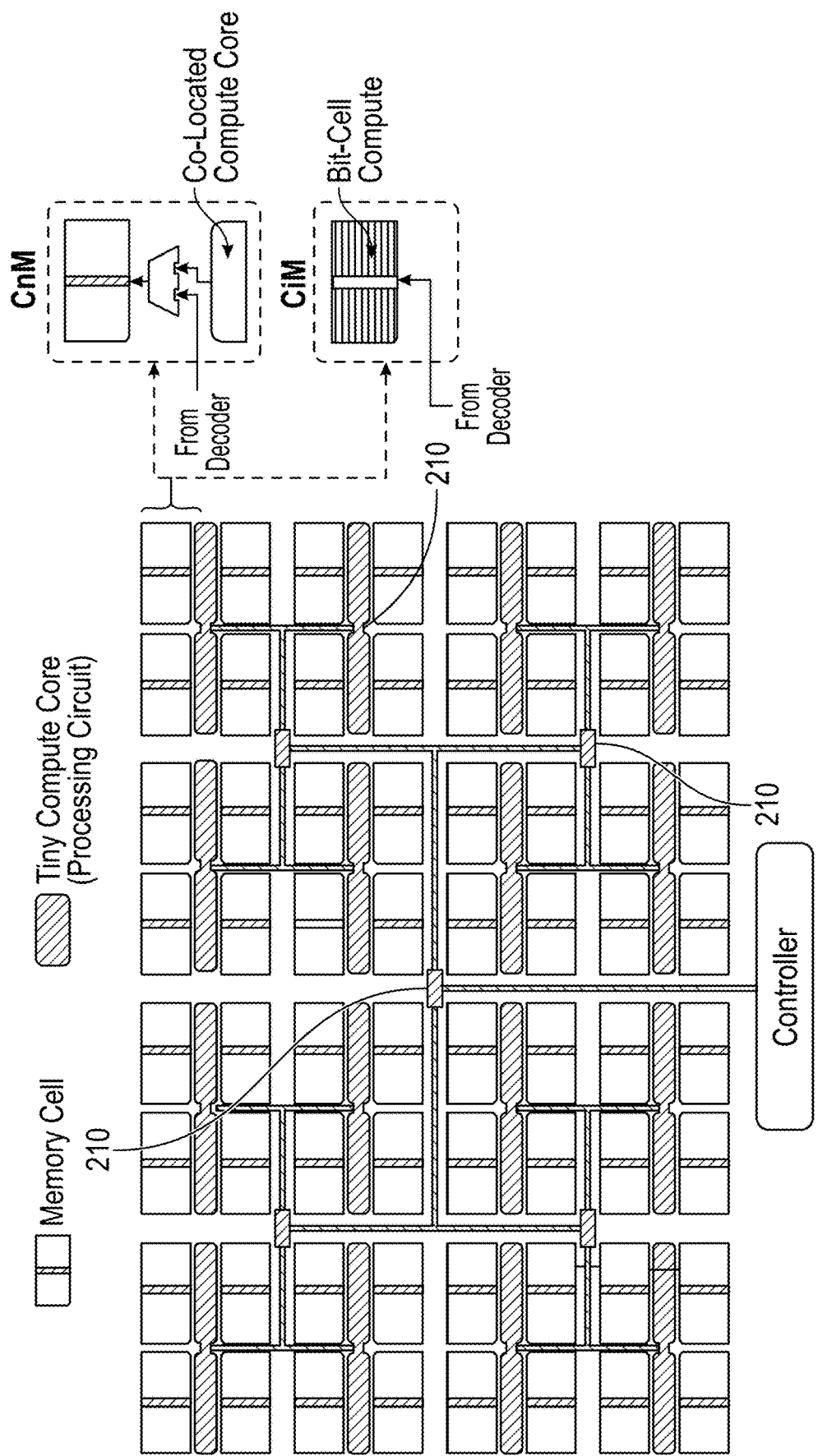
FIG. 2 shows a memory architecture that may enable distributed computation with multi-cast according to one embodiment.

FIG. 2 shows a memory architecture that may enable distributed computation with multi-cast according to one embodiment. As shown in FIG. 2, individual memory arrays 200 (or sub-arrays) may include a memory-disposed processing circuit capable of performing computation on one or more of the memory cells of a memory subarray. A processing circuit includes circuitry for performing computational operations, and may include storing the result of the operation to a memory location. For example, the processing circuit may be configured (e.g., via operational instructions) to retrieve the value of one memory address in an associated sub-array, multiply it by a value residing in another memory address in the associated sub-array, and store the result in a location in the sub-array. The processing circuit may also be configured to execute computational operations particularly suited to highly-distributed processing workloads, such as operations typically performed in matrix/tensor or computer modeling/neural network processes, including multiply-and-accumulate (MAC) operations.

In one embodiment, each sub-array includes a processing circuit. In some embodiments, a processing circuit is provisioned for each lowest-level decoder in the hierarchical memory, such that the processing circuit may access and/or perform compute operations with the same memory cells/locations addressable by the decoder. The memory may include memory of various sizes, the particular hardware capabilities of the processing circuit may also vary. For example, each memory sub-array in one embodiment includes 8 Kb of memory, and the compute core may be capable of performing various computational operations on the associated memory, such as multiplication or addition, and may particularly be configured to perform computational operations related to distributed or parallel-processing tasks, such as multiply-and-accumulate (MAC) functions, pooling, etc., that may benefit from the multi-cast data as discussed further below. In general, the architecture thus provides for distributed processing circuits (e.g., compute cores or in-memory compute) associated with the hierarchically-addressable memory for performing operations related to the local memory associated with the processing circuits.

FIG. 2 shows two example configurations for the processing circuits (i.e., to place compute within the addressable memory architecture). In one embodiment, the memory array includes a co-located compute core 200A, also termed "Compute-Near-Memory" ("CnM"). In another embodiment, the memory array includes integrated bit-cell compute, also termed "compute-in-memory" or ("CiM"). In each case, the plurality of memory arrays 200 include local processing circuits that may perform computation on memory cells within a memory bank/larger memory architecture. This permits widely-distributed computation when data for performing such computations may be effectively distributed to and used by the processing circuits. To provide data for such parallel computation, data write requests may be multicast by decoders 210 at each level of the memory addressing hierarchy. As discussed more fully below, a particular write instruction may include a set of multicast addressing bits for designating which lower-level decoders to receive a write instruction from a higher-level decoder. In this context, a "higher" hierarchical decoder level refers to a decoder relatively closer to receiving the request from the controller, while a relatively 'lower" addressing level refers to a decoder relatively closer to communicating with the memory cells. Stated another way, a "higher" hierarchical decoder level typically processes the most-significant addressing bits and sends the request to subsequent "lower" hierarchical decoders for further processing. Similarly, confirmation of a request (e.g., a successful data write) is returned from a "lower" hierarchical decoder to a higher hierarchical decoder level to confirm successful processing of the write request. Using the multicast addressing, a decoder at each hierarchical level can route a data write request to one or more fan-outs in the next inner level hierarchy (i.e., the next-lower hierarchical level) and thus enable a multi-cast dataflow. In addition, as discussed below, in various embodiments, data at each level may be separately designated for multicast or individual addressing, and may thus send a particular request (based on its multicast addressing bits) to one or more (up to all) of the lower-level hierarchical levels.

As such, the multicast along with processing circuits co-located with the memory provide an effective approach for performing distributed computing (i.e., distributed across the processing circuits) of workloads that share similar data or operations. When the same information (e.g., one data operand) may be the same across multiple computations, that information may be multicast to several memory subarrays (or other addressable portions of memory across the memory bank) for computation by respective processing circuits. This may permit one memory write request and distributed computation step for what may otherwise require several write requests to position relevant data for parallel computation or forgo parallel computation performing such computation. As such, although the workloads (i.e., the specific types of computation and related data characteristics) discussed below generally relate to computer model/AI-related workloads that may include neural network layers and/or other circumstances in which matrix/tensor processing may benefit from such distributed computation using efficiencies in the multicast distribution of data for the computation, the approaches discussed herein may benefit various other types of data/computation workloads that include multiple computations based on the same input data. I.e., circumstances in which the input data may be effectively multicast with a write request for use by respective co-located processing circuits.

As such, this disclosure includes a co-located compute (e.g., in/near memory) architecture as shown in FIG. 2 that may be used for distributed computing of AI workloads. As an overview, the present disclosure improves on placement of compute near to memory or in memory by including multi-cast dataflow capability in decoder/interconnect at each hierarchical stage and allows for the request to dynamically (runtime) configure multicast information for routing through one or more fan-outs. This permits individual write instructions to specify multicast address bits and accordingly modify the individual routing through one or more fan-outs according to the per-layer multicast address information. This flexibility also permits ready distribution of write request data to many individual memory locations across a memory bank with a multicast-enabled write request specifying multicast address bits. This may allow the division of types of data for multicast distribution and precise addressing across various decoders at varying hierarchical levels (as is also discussed in further detail below). For example, in matrix or tensor processing, e.g., for a neural network layer, a first matrix (e.g., an input feature map) may be multiplied (and optionally subsequently accumulated, among other potential operations for the layer) with respect to a second matrix (e.g., a weight matrix). The overall multiplication of the first matrix and the second matrix may be coordinated by the effective use of the multicast bits to distribute unique combinations of portions of the first matrix and second matrix to the memory accessible by an associated processing circuit, which may perform the computation on the combination of the portions of the first and second matrix. The respective portion of each matrix used in the one compute operation may also be referred to as a "chunk." Similarly, each computation operation to be performed by a processing circuit may be referred to as a "tile" that may include a respective chunk of each operand of the computation operation (here, the multiplication operation may require a particular chunk of the first matrix and a particular chunk of the second matrix). In this example, although each processing circuit may operate on a tile specifying a unique combination of chunks (i.e., one from the first matrix and another from the second matrix), each respective data chunk may be used in more than one tile being computed. Thus, a particular data chunk may be multicast to the memory subarrays for the respective tiles that operate on that data chunk. As such, after writing the relevant data chunks using the multicast address bits, this approach may also allow parallelized execution of a neural network layer across all processing circuits present in the memory architecture. In addition, in embodiments using the multicast address bits, the memory architecture may also retain normal memory access functionality for external agent(s) towards shared and private data accesses. That is, in addition to the co-located processing capabilities, because the multicast operations may be effectively combined with single-memory addressing, the memory architecture may maintain normal or "typical" operation with respect to other components using the memory architecture, such as a processing unit external to the memory.

Effectively utilizing the distributed computing as represented in FIG. 2 may pose additional challenges in parallelizing execution across all processing circuits. As additional cross-path wires are generally disfavored to retain memory density, required data for a processing circuit (e.g., the data to be operated on by the processing circuit) may be supplied through interconnect wires. In typical memory bank architectures, data accesses within a bank are serially executed, preventing effective parallel provision of data to co-located processing circuits in multiple locations within the memory bank. And, therefore, data movement required to keep co-located processing circuits busy often limits the overall performance due to bandwidth constraints. The multicast framework discussed herein provides an approach for using the high-level of parallelism in many applications, such as neural network layer processing, such that multiple processing circuits can operate in parallel on parts of an overall workload in which individual computations may share input data with other computations, although no individual computation may perform identical processing. For example, the same portion of input feature data or weight data in a neural network layer may be used repeated by different calculations. That is, the same portion of input feature data may be applied to different sets of weights, while, similarly, the same set of weights may be applied to different portions of input feature data. By using the multicast capability at each hierarchical stage, a graph compiler (or work scheduler) can reduce data movement significantly by maximizing the beneficial effect of parallelizable computation and per-layer configurable multicast provision of data. This allows distribution of re-used data with the multicast architecture while also allowing a unique combination of data to be manipulated by each computing circuit.

Figure 3:
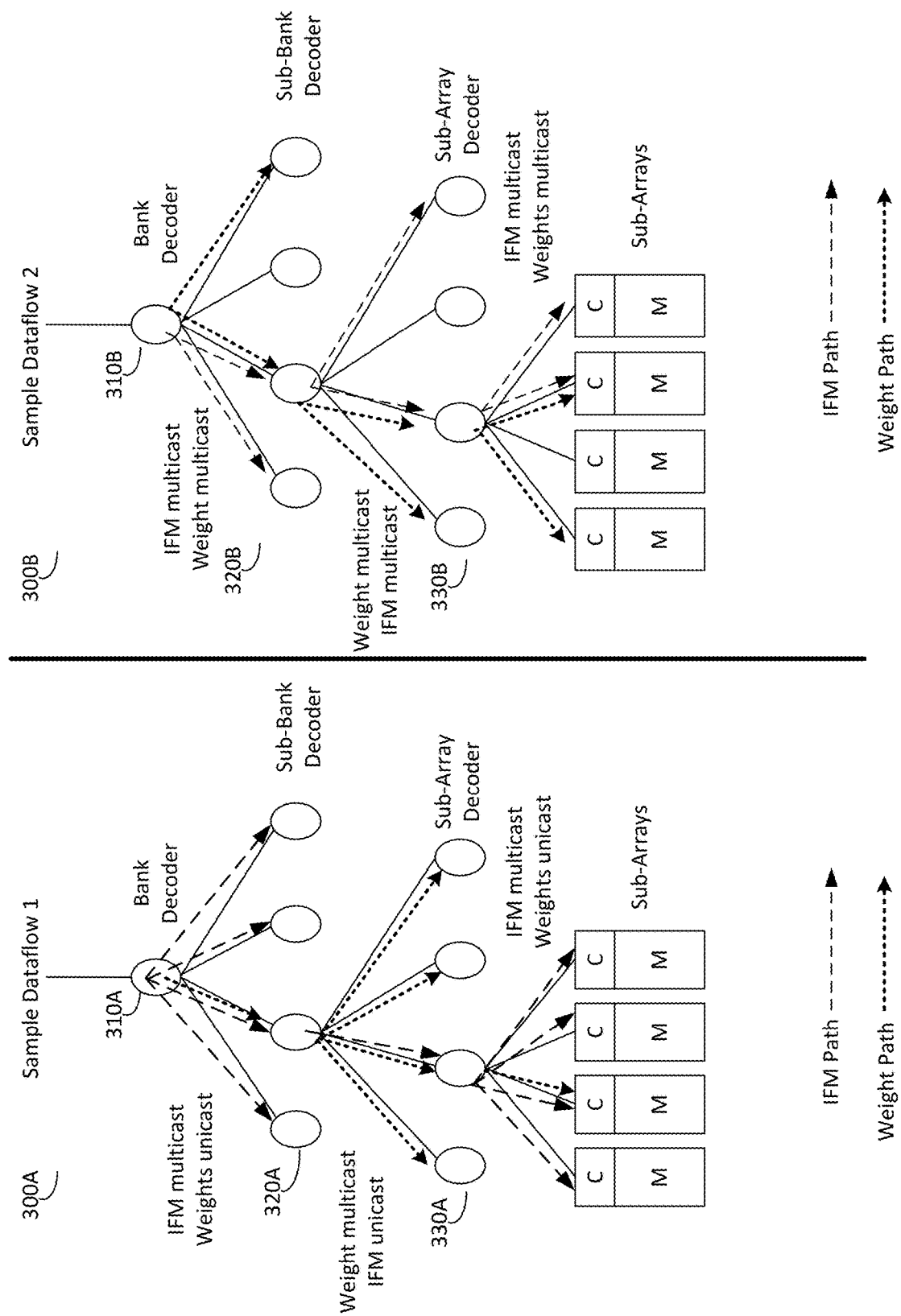
FIG. 3 shows sample dataflows for a memory architecture example with three hierarchy levels, according to one embodiment.

FIG. 3 shows sample dataflows for a memory architecture example with three hierarchy levels, according to one embodiment. Additional details regarding the identification of particular workflows and coordination of multicasting data for parallel processing is further discussed below, as well as example circuit logic for decoders to provide the configurable multicasting. In the example of FIG. 3, a request may be initially received by a bank decoder from a data controller. The bank-level decoder processes the addressing and may multicast or unicast the request to a particular memory bank and a respective sub-bank decoder, which subsequently routes the request to a designated sub-array decoder(s), which provide the request to individual subarrays. At each hierarchical level, the request may be unicast (e.g., sent to one lower-level decoder) or may be multicast to more than one lower-level decoder. Thus, this memory architecture example has three levels of hierarchy: a sub-array representing one more memory-cells that are tightly coupled (e.g., co-located) with a computing core, 4 sub-arrays constitute one sub-bank, 4 sub-banks are grouped into 1 bank, and the entire memory may include 4 banks. At each hierarchy stage i.e., bank, sub-bank, or sub-array decoder, a write data access can be routed through one or more fan-outs using the multicast capability. Although three hierarchical levels are shown in this example and generally used for examples discussed herein, the memory architecture may include any number of hierarchical levels to access and address the memory subarrays.

In the example shown in FIG. 3, the memory architecture is used for processing portions of a neural network layer. The data for the neural network layer includes input data from an input feature matrix (IFM) and data from a weight matrix. In general, the values from the input feature matrix may be multiplied by values in the weight matrix and accumulated, along with other operations, to generate an output for a portion of the neural network layer. FIG. 3 shows different dataflows for distributing the relevant data to the subarrays for processing by the processing circuits at each subarray. These two sample dataflows represent two potential scenarios for distributing data that may be used; in various configurations, different data may be distributed in different ways, and this example shows two such dataflows for multicasting data. The particular dataflows may vary based on the configuration of the memory and the parameters of individual layers of a neural network. In each scenario, the input feature map (IFM) and weight data can have different multi-cast configuration at each hierarchy level in such a way that there is a unique combination of IFM and weight data present in any sub-array for the co-located processing circuit to process.

In a first example dataflow 300A, the different types of data are multicast and unicast at the different hierarchical levels. Shown in these example dataflows 300A and 300B are example dataflows for a given portion of data for a portion of the computational processing; that is, different portions of the IFM or weight data may be similarly multicast or unicast to different combinations of memory arrays than as shown in this example. At the bank-level decoder 310A, the IFM data is multicast, in this case to every bank and respective sub-bank decoder, while the weight data is unicast to a single memory bank and its respective sub-bank decoder 320A. At the sub-bank level decoder 320A, the IFM data is instead unicast, while the weight data is multicast to sub-banks and respective sub-array decoders 330A. At the sub-array decoders 330A, the IFM data is again multicast, while the weight data is unicast. In various configurations, the unicast/multicast operations may be the same for each decoder within a given level in the hierarchy. For example, shown in this example of FIG. 3, the IFM data is multicast to each bank, and at the sub-bank level decoder 320A, the IFM data is unicast to the second sub-bank and respective sub-array decoder 330A, which multicasts it to all sub-arrays. While a single set of sub-arrays and sub-banks are shown in this figure, the same operation may be performed by the respective sub-bank and sub-array decoders in the other memory banks. For example, while this example shows a second sub-bank decoder receiving the request, the first, third and fourth sub-bank decoders also receive the IFM multicast data. As with the second sub-bank decoder shown in FIG. 3 to unicast the IFM data, the other sub-bank decoders may likewise apply the same routing within its hierarchy. Stated another way, the other sub-bank decoders may likewise unicast the IFM data and the sub-array decoders receiving the IFM data may multicast to their respective sub-arrays. This configuration is further discussed with respect to FIG. 11. Each portion of data may also traverse a different path based on its data type. For example, in this example the IFM data is multicast at the bank decoder and unicast at the sub-bank decoder. Thus, different portions of IFM data may also be multicast at the bank decoder and unicast to a different sub-bank decoder, such that sub-arrays at a different sub-bank receive the data.

Dataflow 300B shows another example dataflow, in which the IFM and weight data is each multicast at different decoder levels. In this example, each data type is cast to two lower-level decoders by each decoder, rather than modifying unicast or multicast fan-out at different levels for the respective data types. As such, the bank decoder 310B multicasts the IFM and weight data to two sub-bank decoders 320B, which multicast them to two sub-array decoders 330B, which multi-casts to respective sub-arrays. Note that only one sub-array receives both this IFM and this weight data. Because each level multicasts to different combinations of lower-level decoders, each sub-array may receive a unique combination of weight and IFM data for performing respective processing, while the multicast capability allows the parallel data to be loaded readily near the respective processing circuit for parallel processing. Depending on the data configuration and other model parameters, the data may be differently distributed to the individual sub-arrays to perform processing of the data.

Data Tiling and "Supertile" Workflows

To provide processing of neural network layers, the particular distribution of data to sub-arrays and operations for distributing the data and executing the computations is determined for a given processing task (e.g., to implement processing for a particular neural network layer). As discussed above, a sub-array (SA) includes a processing circuit with one or more accessible memory cells for performing computational tasks. The processing circuit can access data present in any of memory cell(s) in a sub-array. When the memory architecture is a CiM (compute-in-memory) architecture with bit-cell compute capability, a sub-array is a memory array which can be programmed independently.

As discussed above, a processing task may be divided into a set of "tiles" for processing. A tile represents a quantum of data consisting of input and output operands that can fit in a sub-array and be processed without any inter-dependency. Stated another way, the computation for a processing task may be separated into a number of "tiles" of computation to be performed, representing the processing that may be distributed to and performed by the distributed processing circuits within the memory. The total number of tiles of computation may thus represent the total number of processing circuits that may be performed in a given compute phase.

In one embodiment, the processing circuits are used in parallel to execute synchronized execution of computation. Initially, a data transfer phase may be used to transfer relevant data for a set of computations (e.g., for the related tiles to be processed) to the memory sub-arrays, after which a compute phase may be used for the processing circuits to perform the specified operations. The set of operations to be performed in parallel across the memory architecture termed a "Supertile." The "supertile" may represent the computation performed that may include different input sets. To perform the supertile computation, the relevant input data is transferred during the data transfer phase and multicast to the individual subarrays that will use the respective data. Next, the computation operation is performed by the sub-arrays on the data on the local subarrays, executing the parallel computation. In the example that follows, the input sets include a set of input values from an input feature map and a set of input values from a weight matrix. The "supertile" computations discussed below include processing a portion of the input feature map with a portion of the weight matrix. Each computation tile includes processing of a unique combination of the respective input data sets, thus maximizing the use of the processing circuits and avoiding redundant computation. Although generally relating to neural network processing, in other embodiments, the selected input data may be identified with similar approaches to those discussed below for selecting and processing a supertile based on computation and input values.

In one embodiment, all the available computing cores performs synchronized execution entering and exiting compute-phase simultaneously. During the data transfer phase, sub-arrays co-located to computing cores are populated with a tile worth of new input operand data through multicast data flow while required output operand data may be read out optionally. During the compute phase, computing cores performs one or more operations such as convolution, matrix multiply, quantization, pooling, activation function as directed by the controller. When two or more computing cores compute partial OFM tiles, additional data-transfer phase followed by a compute phase with reduction operation is performed.

To effectively execute such processing, data tiles are grouped to form data supertiles based on the memory characteristics, neural network parameters, and workflow optimization.

Figure 4:
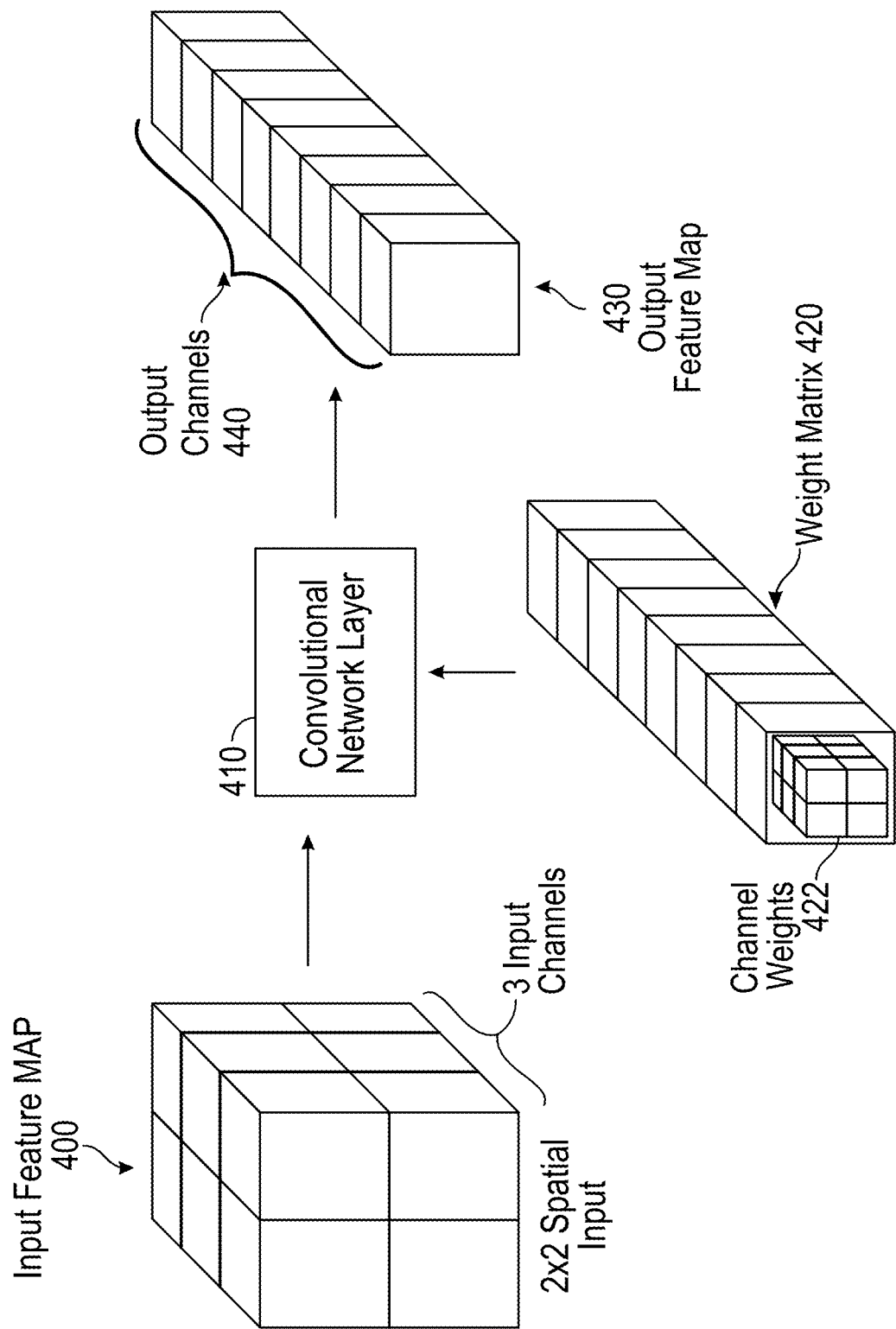
FIG. 4 illustrates an example neural network layer that may be parallelized for execution with a memory architecture according to one embodiment.

FIG. 4 illustrates an example neural network layer that may be parallelized as discussed herein. FIG. 4 illustrates a convolutional network layer 410 that may process an input feature map 400 to generate an output feature map 430 that has a set of output channels 440. This example may represent, for example, a dimensional reduction convolution in a neural network that processes a 2×2 portion of an image having three color channels (e.g., red, green, blue), into a 1×1 region having output channels 440. In practice, this 2×2 convolution may be applied to an image to reduce its size and characterize the image with the channels of the output feature map instead of the three color channels.

As shown in this example, the output feature map 430 may be associated with a weight matrix 420, which includes a set of channel weights 422 for each of the output channels 440. In this example, each of the output channels 440 has an associated set of channel weights 422 that designate the weights and other operations to be applied to the input feature map 400 to calculate that channel of the output feature map 430. As such, the same input feature map may be processed by the respective channel weights 422 for each channel of output. In this relatively simple example, each output channel may thus include weights for each of the 12 values in the input feature map. After multiplication of the respective values of the input feature map with the respective weight for a channel, the results may be accumulated and additional values, such as a bias, may be applied before processing by an activation function to determine the value for the output channel. As such, even performing the input× weight calculations for the eight-channel output in one convolution may represent 96 individual multiplications (12×8).

Figure 5:
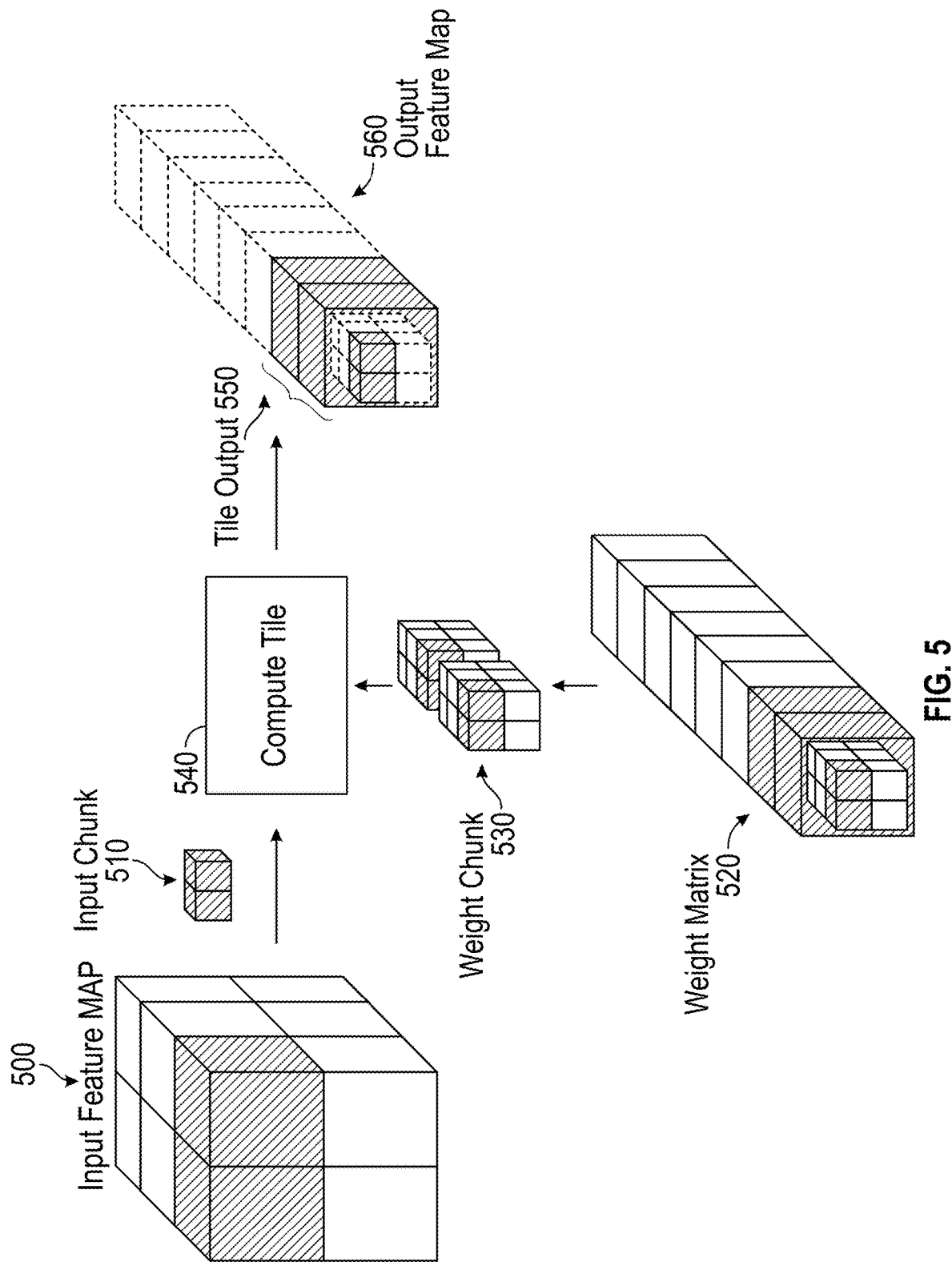
FIG. 5 shows one example of a computation tile (also termed a compute tile) for a neural network layer, according to one embodiment.

FIG. 5 shows one example of a computation tile (also termed a compute tile) for a neural network layer, according to one embodiment. As discussed above, the computation that may be performed by an individual processing circuit in a subarray in a compute phase is termed a tile. The particular size of the computation, along with the inputs and outputs that may be processed by the subarray within a compute phase varies in different embodiments and will differ based on the particular characteristics of the subarray. To determine an optimal selection of tiles and group the tiles for simultaneous execution (e.g., in a supertile), the size of the respective inputs and outputs may be determined in determining the operations for executing a given workflow. A given compute tile 540 may process an input chunk 510 from an input feature map 500 and a weight chunk 530 from the weight matrix 520 to generate a tile output 550. The tile output 550 represents a portion of the total output feature map 560, and typically will be combined with the results from other tiles to calculate the complete result for the workflow, such as the complete set of output channels for output feature map 560. Each of the data chunks (here, the input chunk 510 and weight chunk 530) represent portions of the input data that may be processed by the compute tile 540 within the compute phase. That is, the size of the data chunks are determined such that one compute tile may process one data chunk in the respective dimensions for the computation. The selection of the size of the chunks may vary according to the neural network parameters and the capabilities of the memory and processing circuit. In this example, the input chunk 510 includes two spatial regions (e.g., two pixels of the 2×2 portion of the image) and one channel of those spatial regions. To process the input chunk 510 having two spatial regions each having one channel, the respective portion of the weight matrix is selected for the weight chunk 530. In this example, the weight chunk 530 includes the weights for the respective portion of input for two output channels. That is, the weights for the portion of the input feature map 500 corresponding to the input chunk 510 for each of two output channels is selected in this example as the weight chunk 530. As shown by this example, the same input chunk 510 may be used by multiple output channels, such that the same input data may be used by multiple compute tiles.

As also shown in this example, the tile output 550 includes a portion of the required data for computing the output feature map 560. For example, to compute the value of the partially-computed output channels, the remaining weights of the weight matrix 520 are processed with the respective portions of the input feature map 500 and combined. As shown by this example, the same input chunk 510 may be used to calculate several values in the output feature map 560 and may, e.g., be used by each of the respective weight chunks 530 of the weights for the output channels.

Figure 6:
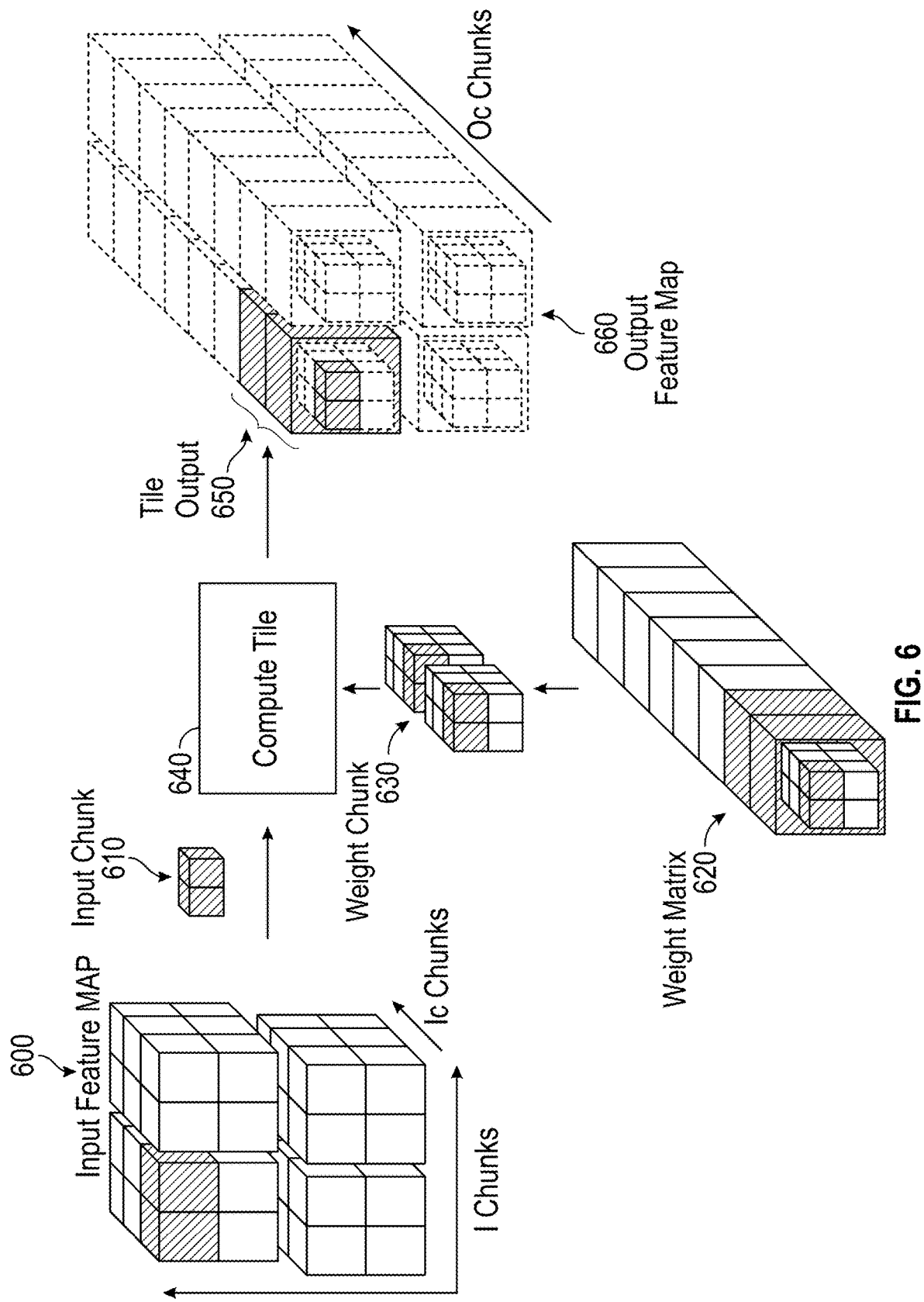
FIG. 6 shows an example of an input feature map 600 and an output feature map 660 in which a weight chunk may be reused by multiple compute tiles 640.

FIG. 6 shows an example of an input feature map 600 and an output feature map 660 in which a weight chunk may be reused by multiple compute tiles 640. The example of FIG. 6 shows an example of the convolutional layer shown in FIGS. 4 and 5 as applied to a larger input feature map 600. In this example, the convolutional filter represented by the weight matrix 620 is applied to multiple 2×2 portions of an input feature map 600 to generate an output feature map 660. As with the example shown in FIG. 5, the compute tile 640 may process an input chunk 610 with a weight chunk 630 to generate a tile output 650 representing a partial calculation for two channels of a portion of the output feature map 660. In this example, the weight matrix 620 may be applied to each of the 2×2 portions of the input feature map 600 to generate the output feature map 660. As such, the complete set of compute tiles 640 may include multiple tiles in which the same input chunk 610 is applied to different output channel weights and multiple tiles in which the same weight chunk 630 is applied to different input chunks 610 corresponding to the different spatial input chunks, termed I chunks. As such, the compute tiles 640 align across I chunks (spatial input regions), Ic chunks (input channel chunks), and Oc chunks (output channel chunks). Stated another way, each spatial input region and associated channels may be processed by a set of weights for a given output channel. As discussed further below, a "supertile" of tiles may thus be determined to coordinate processing across I chunks, Ic chunks, and Oc chunks, corresponding to the weights applied to a particular input region(s), its channel(s), and the output channel(s) to which the weights apply. Using the size of a chunks and respective amount of computation that may be performed in a compute tile, a set of tiles for simultaneous execution may be determined and coordinated for data distribution and processing by the memory architecture.

To effectively use the multicast capability in a hierarchical structure, multiple tiles are grouped into a supertile, representing a quantum of work that may be executed simultaneously on the memory architecture.

Figure 7A:
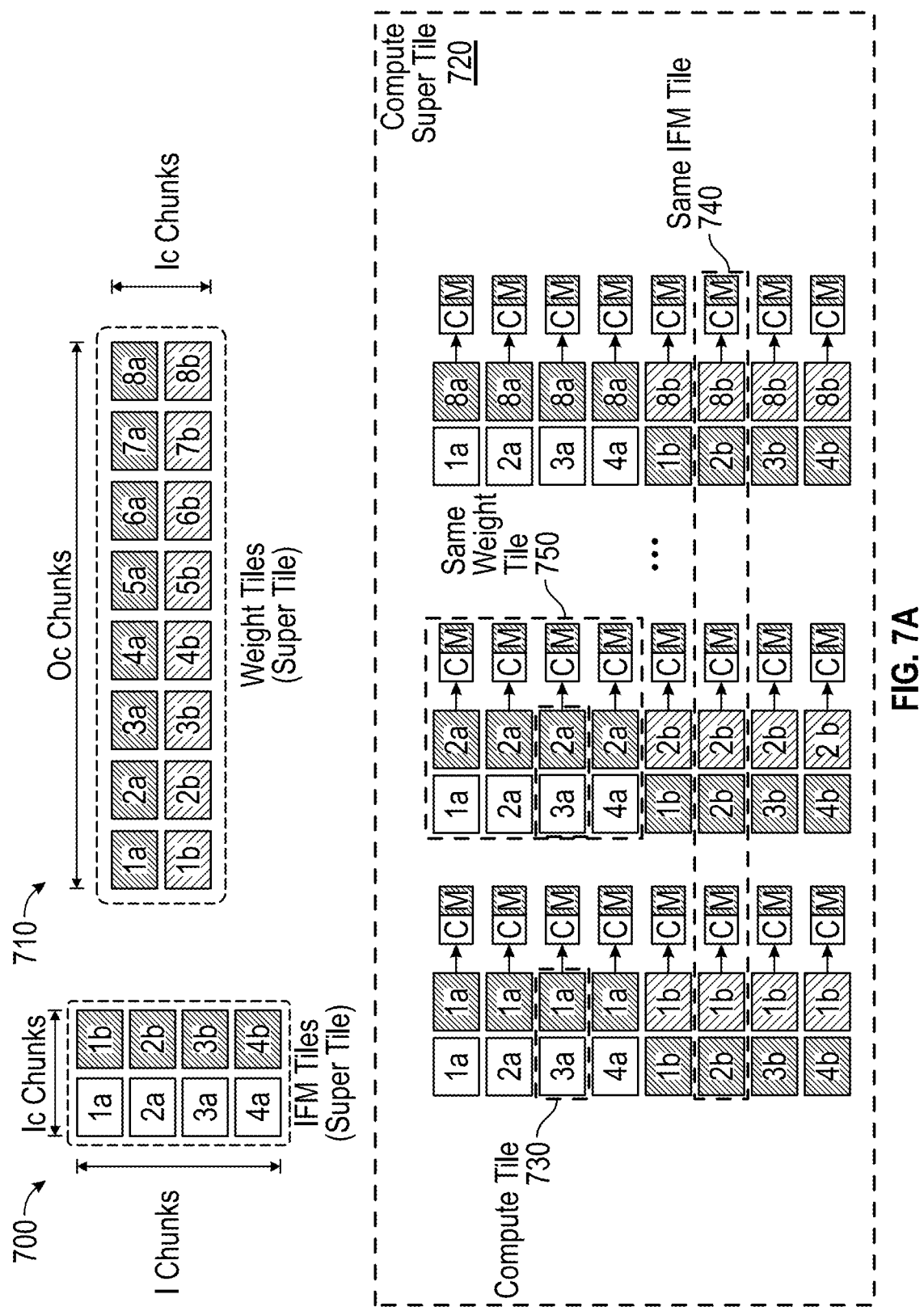
FIGS. 7A-7C illustrate the grouping of work to be performed simultaneously on the memory architecture as well as the multicasting distribution of data for performing the work, according to one embodiment.
Figure 7B:
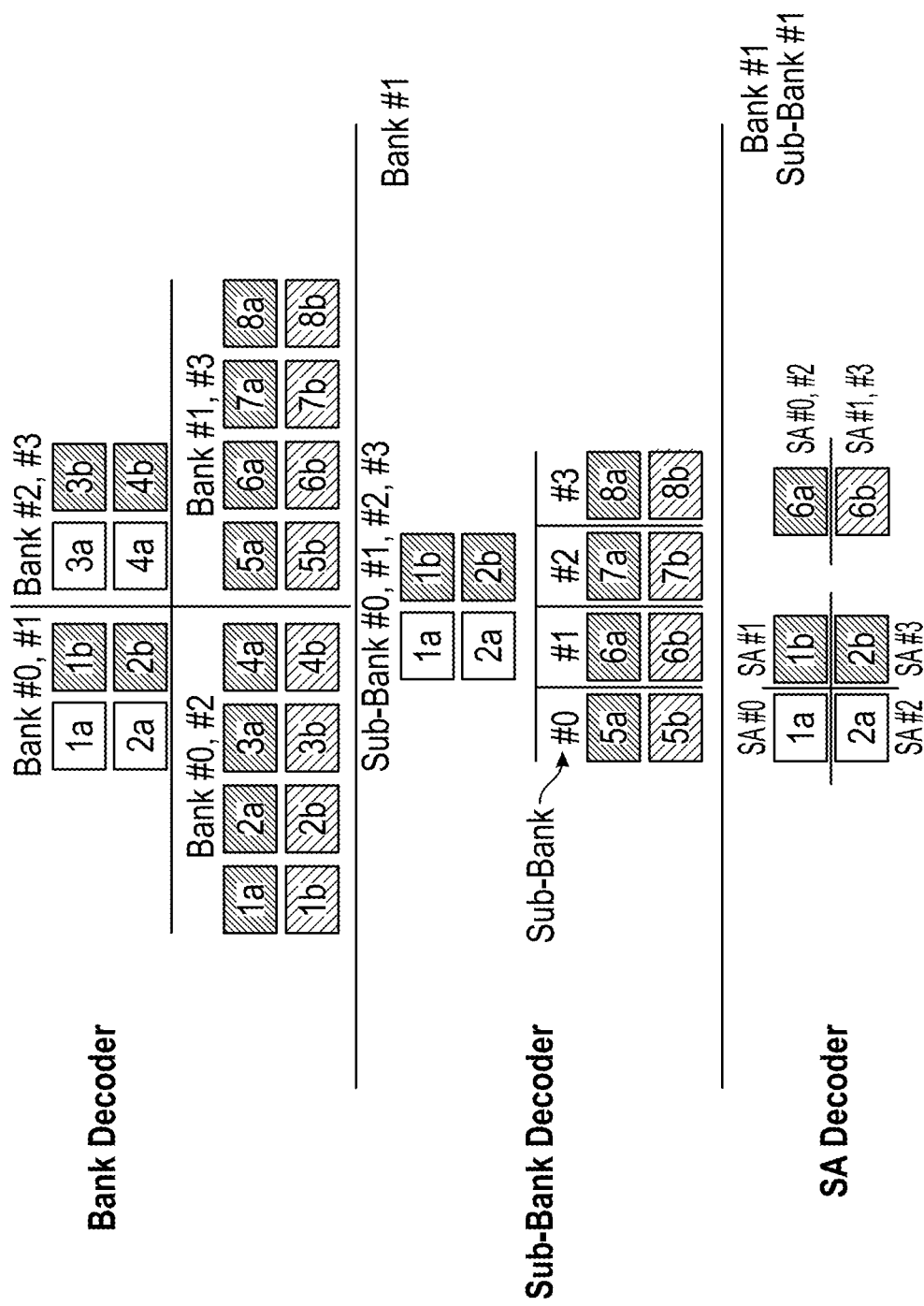
Figure 7C:
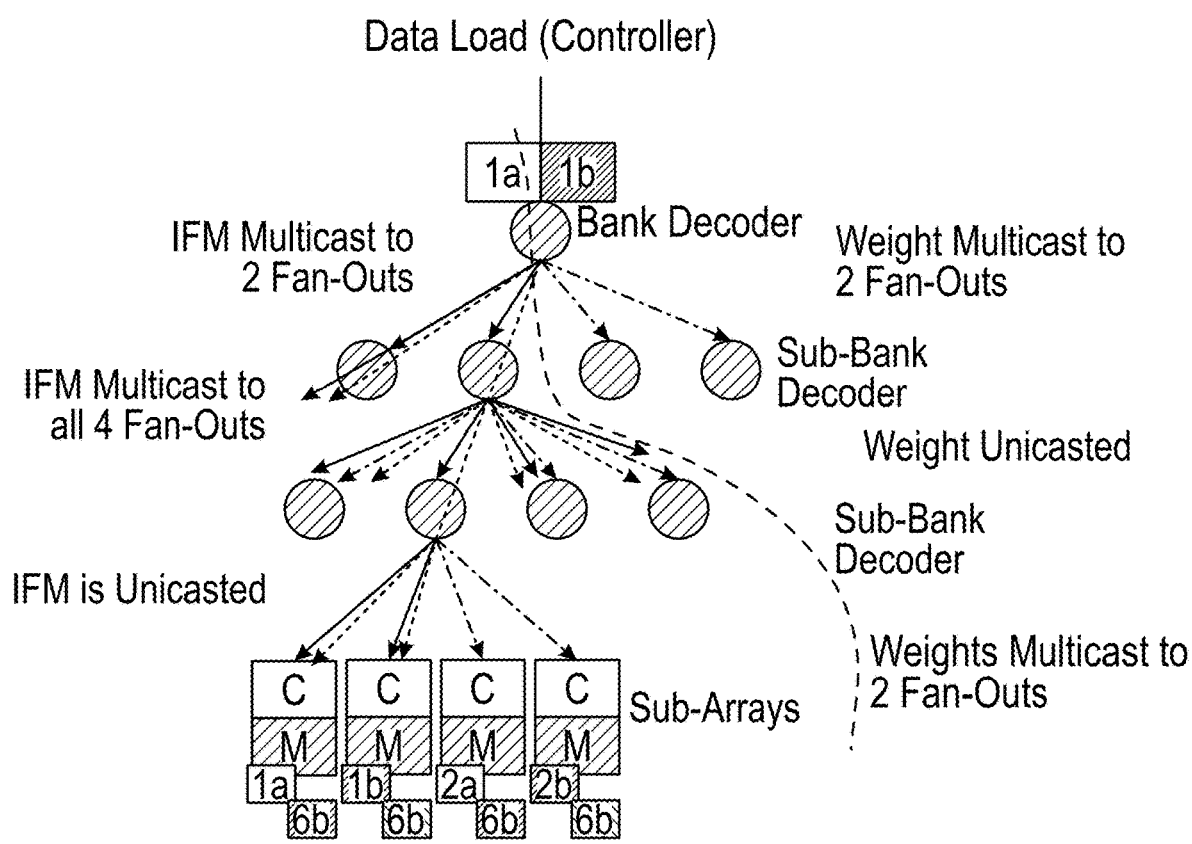
Figure 8A:
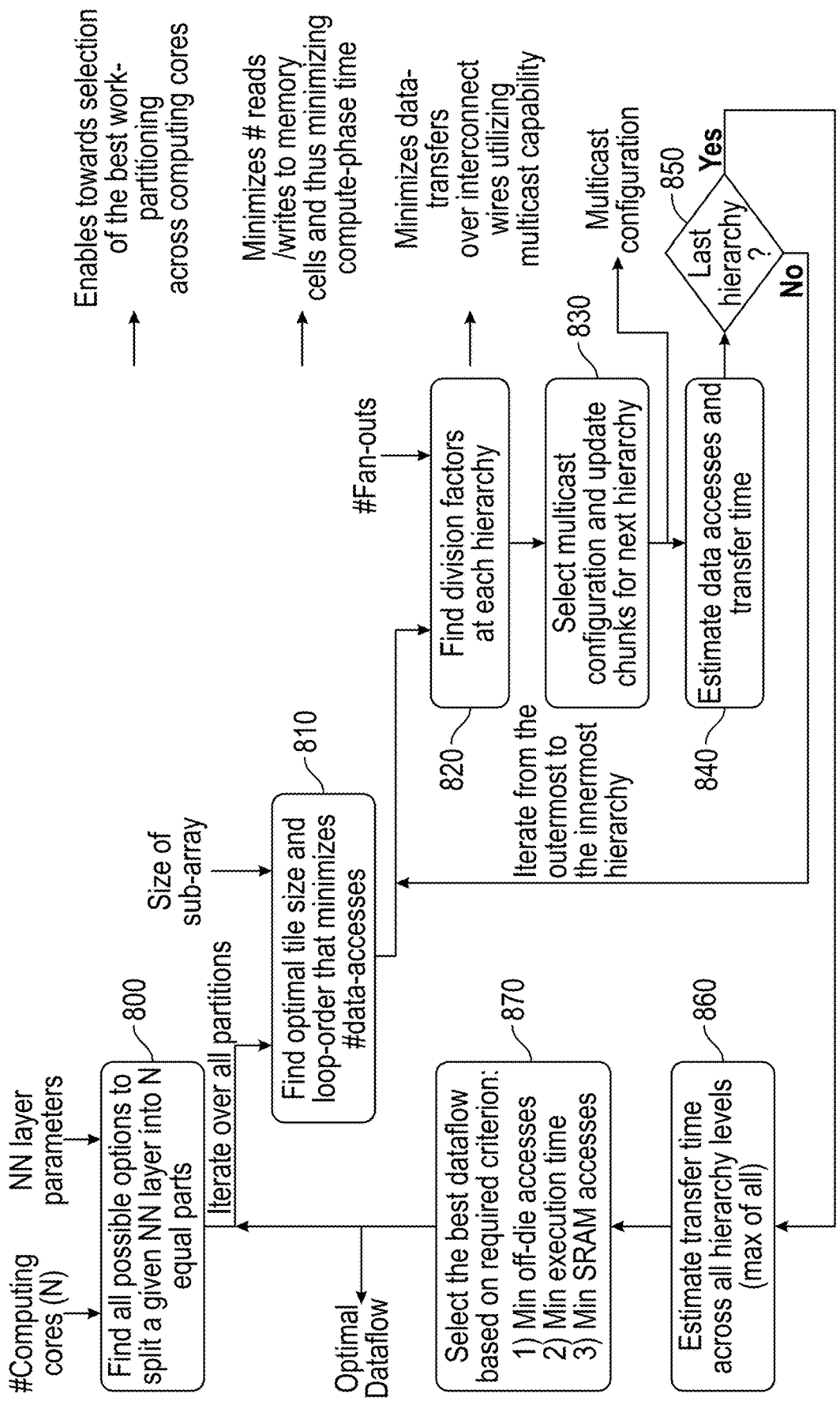

FIGS. 7A-7C illustrate the grouping of work to be performed simultaneously on the memory architecture as well as the multicasting distribution of data for performing the work. The amount of work that may be performed simultaneously is termed a "supertile" or "compute supertile." To effectively perform the work using the parallel computation available in the memory architecture, the respective data used in a compute supertile is grouped to form one or more respective data supertiles. In the example shown in FIG. 7A, IFM data tiles and weight tiles are grouped, respectively, into an IFM supertile 700 and a weight supertile 710. As noted above, the supertile represents the parallel processing that may be performed by the compute tiles in parallel, e.g., in a synchronized compute phase after the relevant data is loaded via multicast operations.

Each of the IFM (input feature map) tiles represents a portion of input data representing a spatial region (an I chunk) and channel data for that (an Ic chunk). As such, the IFM data tile "1a" represents a first spatial region and a first set of channel data for the first spatial region. Likewise, the weight tiles represent the weight chunks for individual channels of the output, designated Oc chunks, and, for each output channel, respective weights for the corresponding sets of input channel (Ic) chunks. That is, the weights for the output channels are separated into chunks corresponding to the chunks of the input channels. For example, if an input includes four channels, and an Ic chunk includes data for two channels, the weights for the output channels are similarly separated into weights for the two channels corresponding to each of the Ic chunks. As such, the number of Ic chunks for each channel in the weight supertile 710 should match the number of Ic chunks for each I chunk in the IFM supertile 700. This means that the division of channels in the input is matched by the division of channels in the weights. As such, the weight tile "1a" may include the weights applicable for output channel "1" as applied to the "a" channels in the input tiles.

Thus, based on NN layer parameters and compiler strategy for optimal dataflow, an IFM super tile 700 may contain one or more tiles along spatial (I chunks) and input channel (Ic chunks) dimensions. Similarly, a weight super-tile contains one or more tiles along input channel (Ic chunks) and output channel/filter (Oc chunks) dimensions. In addition, the number of I chunks multiplied by the number of Ic chunks multiplied by the number of Oc chunks is the total number of compute tiles (and hence processing circuits) that may be required by the compute supertile, as each compute tile may process one IFM data tile (e.g., a specific spatial input tile (I chunk) for a set of its channels (Ic chunk) with corresponding output channel weights for that set of input channels (the Oc-Ic weight tile)).

As such, the compute supertile 720 includes compute tiles for the respective combinations of the IFM supertile 700 and weight supertile 710. Each of the respective IFM data tiles and weight tiles are sent to respective memories subarrays. As one example, compute tile 730 includes the "3a" IFM data tile, corresponding to the spatial I chunk "3" and channel "a" and the "1a" weight tile for output channel 1 corresponding to input channel "a." As shown in FIG. 7A, the compute supertile 720 includes compute tiles that each process a unique combination of input data tiles (e.g., IFM-weight combinations), while individual data tiles may be used by more than one compute tile. For example, a group of compute tiles uses the same weight tile 750, corresponding to the "a" group of input channel weights for output channel 2 as used in compute tiles for processing the input tiles for the "a" group of channels across the spatial input chunks 1-4. Similarly, in another example, the spatial I chunk "2" channel set "b" (IFM tile 2b) is processed by a group of compute tiles that uses the same IFM tile 740 for each of the output channels.

As such, the supertile processing may ensure that all computing cores process unique combinations of data tiles without any redundant work. When optimized for the multicast capability, each portion of data of each data tile may also be transferred with one operation, avoiding sequential operations to address different portions of memory. That is, because the multicast addressing may be used to write data to the relevant sub-arrays, the relevant data for a data tile may be populated by sending each piece of data without repeated operations.

To implement the processing in the hierarchical memory, the IFM and weight super-tile are divided hierarchically such that the product of #I chunks, #Ic chunks, and #Oc chunks for a fan-out at any given level in memory hierarchy is equal to a total number of processing circuits (e.g., computing cores) under the fan-out at that hierarchy. In other words, division factors div_I, div_Ic, and div_Oc (for I chunks, Ic chunks, and Oc chunks respectively) at a given hierarchy are chosen in such a way that product of all three division factors is equal to number of fan-outs at that hierarchy level. This division permits the fan-out of the factors to effectively multicast the relevant data tiles to the respective subarrays for parallel computation. As such, a multicast factor for each of I, Ic, and Oc may be determined by dividing the number of fanouts by the respective number of division factors. For example: multicast_fac_I=#fan-outs/div_I. Similarly, a multicast factor for Ic and Oc may be determined.

The multicast factor for the IFM tiles is thus the multicast factor for I multiplied by the multicast factor for Ic. Similarly, the multicast factor for the weight tiles is thus the multicast factor for the Output channels (Oc) multiplied by the multicast factor for the input channels (Ic). Stated another way, multicast_fac_weights=multicast_fac_Oc× multicast_fac_Ic.

The multicast factor of the IFM and weight data determines that any given element of a respective data-type (e.g., IFM tile or weight tile) is multicasted to how many fan-outs at the given memory hierarchy level. As noted above, the selection of fan-outs for multicast is carried out in way that each fan-out gets a unique combination of IFM and weight tiles ensuring no duplication of work.

FIG. 7B shows one example of multicasting data tiles of the supertile of FIG. 7A to different subarrays using the multicast at different decoder hierarchy levels to route the respective data tiles. FIG. 7B shows one example of multicasting to distribute the data tiles of FIG. 7A; other divisions may also be used to distribute the relevant data tiles. As shown in FIG. 7B, at the bank decoder, the IFM and weight supertiles are divided and each data tile is multicast to two banks, such that the IFM and weight tiles divided differently—while the IFM data is separated to banks 0-1 and 2-3, the weight tiles are divided to banks 0 & 2 and 1 & 3. Similarly, while at bank 1 the IFM data tiles are multicast to all sub-banks at the sub-bank decoder level, in this example the weight tiles are each unicast to a single sub-bank (e.g., 5a and 5b to sub-bank 0, 6a and 6b to sub-bank 1, etc.). Finally, at the sub-array decoder at sub-bank 1 of bank 1, each IFM data tile is separately routed to one sub-array, while the weight tiles are multicast to two sub-arrays. As a result, the sub-arrays of bank #1, sub-bank #1 each receive a unique combination of IFM and weight tile. By varying the division of data and multicasting data storage operations, the relevant data can be loaded in the memory sub-arrays for the compute tiles in parallel and across the compute supertile efficiently relative to sequential memory data loading. FIG. 7C illustrates the routing of the data tiles in FIG. 7B through the memory interconnect paths using multicasting to populate the respective subarrays.

Based on the parameters of a particular neural network or other computer model layer (or another computation used in the memory architecture), a given workload may require one or more supertile execution. The supertiles may be processed one after another. Between two super-tiles, data tiles (e.g., either IFM or weight data) may be retained to allow reuse of that data for subsequent computation. The composition of data tiles, supertiles, and the order of processing may be further optimized for a given computation workload and/or memory configuration. In addition, the data associated with partial calculation of an output feature map (OFM) value may be accumulated to maintain the data and maximize re-use for calculation of additional values to complete the calculation for a particular output channel or other data element.

Supertile and Data Flow Optimization

FIGS. 8A-E shows a flowchart and example pseudocode for optimizing and selecting a dataflow for a memory architecture with co-located processing circuits. For example, such co-located processing circuits may include a compute-in-memory or compute-near-memory architecture with multicast capability utilizing hierarchical memory structure in one embodiment. The process shown below may select compute tiles, supertiles, and an optimal order of the same for execution on the memory architecture. This process may be performed by a compiler or other optimizer translating a particular compute workflow to instructions for execution in a hardware processing environment. The optimization may also generate specific operations for executing the workflow, such as the tile selection, division factor, multicast configuration details, etc. In a hierarchical memory structure, there are multiple options for tile selection, tile grouping into super-tile, division of super-tile at each hierarchy, and order of super-tiles to complete a given NN layer execution.

As an initial step, the parameters of the neural network (or another workflow) are received along with the number of processing circuits (e.g., computing cores) available in a multicast-capable memory architecture. The number of processing circuits represents the number of compute tiles available for each supertile. Initially, the possible partitions may be determined based on the I chunks, Ic chunks, and Oc chunks for the network layer. The possible partitions of a NN layer may be determined by determining the possible factors of the number of processing circuits with respect to the number of I chunks, Ic chunks, and Oc chunks that may be processed in a particular supertile. The list of possible partitions for separating the neural network layer may then be further processed to determine the optimal tile size and loop order 810 that reduces memory read/writes. That is, for each possible partition of supertiles executing the workflow (e.g., the layer in the neural network), various steps may be performed to determine the optimal characteristics for executing the partition, along with evaluation of the optimized partition.

Initially, a partition may be evaluated with the size of the sub-array to identify an optimal tile size and loop order to reduce data access. To find 810 the tile size and loop order, the process may divide the layer dimensions into work chunks and identify a loop order and tile size of a work chunk that fits the local memory of a compute tile (e.g., a sub-array). The loop order refers to the order in which tiles may be loaded and processed. To do this, the size of an Ichunk may be identified and used to divide the dimensions of an input matrix, identifying a height and width of the input feature map relative to the I chunks, Ic chunks, and/or Oc chunks. Example pseudocode for identifying the optimal loop order and tile size is shown in FIG. 8B.

Based on the identified loop order, the number of reads and writes to memory cells may be minimized and reduce the time for completing a compute phase. Next, for each hierarchy level of the memory (e.g., the number of decoders before accessing a sub-array), the division factors may be determined 820 to minimize data transfers over the interconnect wires. The selected division factors may designate the division factors for I chunks, Ic chunks, and Oc chunks, such that the total number of division factors equals the number of fan-outs available at the hierarchy level. To determine the division factors, the greatest common factor (gcf) may be determined for the I chunks and Oc chunks. In the example pseudocode below, the division of Ic chunks is based on the number of fan-outs, and the process may be performed recursively such that the remaining chunks may be determined for the next-level the next-level hierarchy. The pseudocode in FIG. 8C provides one example embodiment for determining division factors based on the number of fan-outs. FIG. 8D provides example pseudocode for the solve_div_factors function used in FIG. 8C for solving for factors to minimize the data transfers at each hierarchy.

Next, the multicast configuration values may be selected 830 to update the chunks (i.e., leftover to be evaluated for multicast) for the next hierarchy level. Pseudocode for updating these chunks is provided in FIG. 8E.

At each hierarchy level, the process may also estimate 840 data access and transfer time based on the layer, tile, and division factors of that level. These may be determined based on an analytical model based on the deterministic compute of the computation tiles. As the process processes the hierarchy levels, when the process has not yet reached the last hierarchy, a decision block 850 returns to find 820 division factors at the next hierarchy (e.g., one hierarchical layer down), select a multicast configuration 830, and estimate 840 data transfer characteristics. This thus permits a recursive, hierarchy-driven approach for determining an optimal tile size and division factors for each partition of supertiles determined at step 800. After the last hierarchy is optimized 850, the transfer time is estimated 860 across all hierarchy levels, and once the partitions have been evaluated, the best dataflow for the partitions may be selected 870 based on off-die accesses, execution time, SRAM accesses, etc. As such, the optimization process of FIG. 8 may be used to evaluate a neural network layer, enumerate possible partitions of compute tiles, optimize such partitions with respect to tile size and loop order, and optimize division factors and other characteristics for executing the compute tiles with respect to overall performance, including consideration of execution time, off-memory accesses, etc. The supertiles and parameters for multicasting for executing the workflow for the neural network layer may then be converted to a set of instructions for transferring the relevant data tiles to the subarrays via the determined multicast operations and for instructing the processing circuits in the subarray to execute the desired operation on the respective memory elements.

Decoder Micro-Architecture

Figure 9:
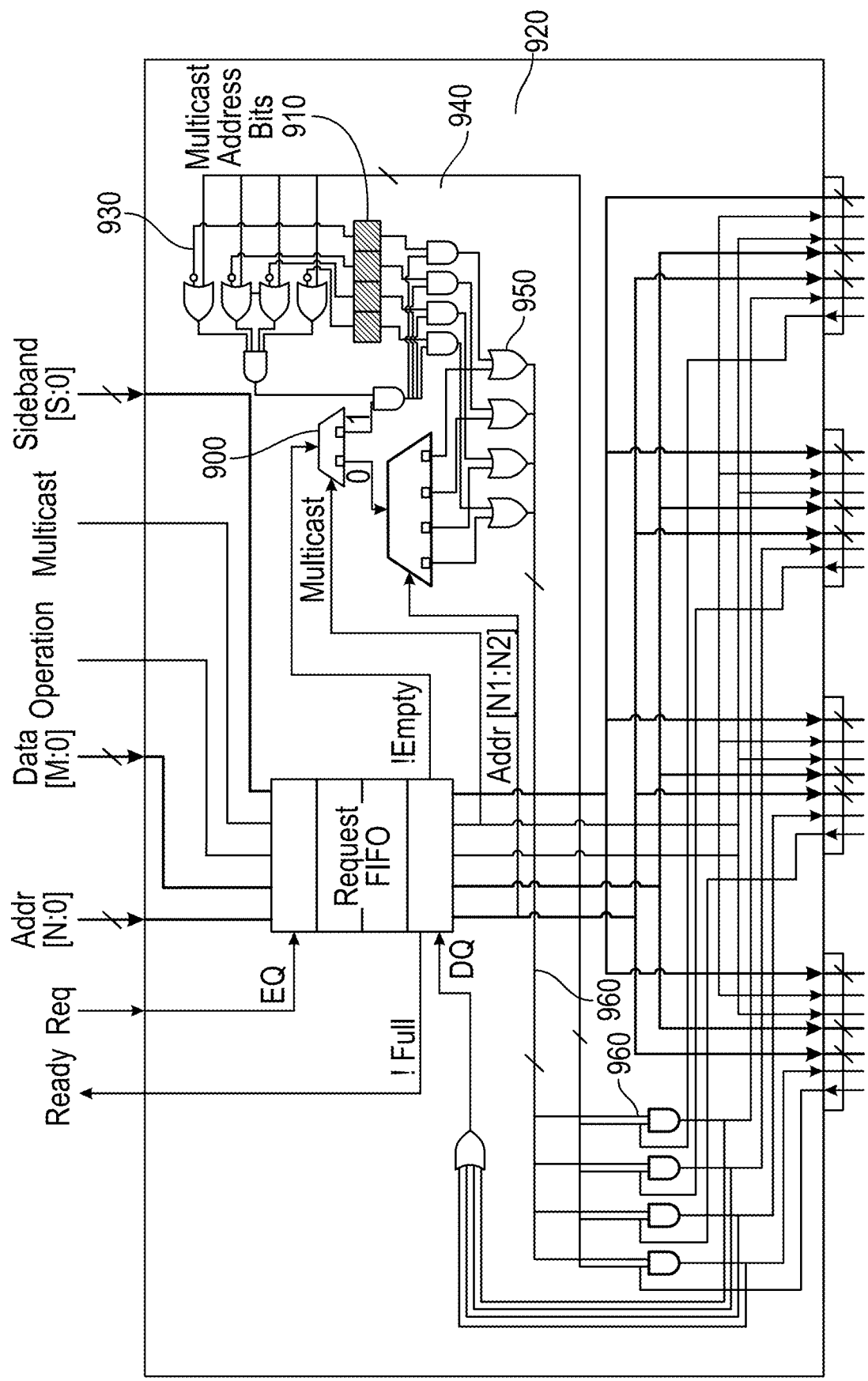
FIG. 9 shows a micro-architecture for providing multicast support to providing operations to a lower-level of the decoder hierarchy.

FIG. 9 shows a micro-architecture for providing multicast support to providing operations to a lower-level of the decoder hierarchy. The decoder architecture shown herein may be provided for each of the decoders in the hierarchy for addressing operations and other requests to the next lower level of the hierarchy. In this example, the micro-architectural changes provide on par performance for normal data-accesses (i.e., without multicast capability) at any point of time during the operation and preserve the ability to send operations with addressing without multicast. Generally, to indicate a multicast command, a multicast bit is set (e.g., a multicast activation bit), along with a number of multicast addressing bits. The multicast addressing bits may be used to designate which lower-level decoders should receive the multicast data. In this example, the multicast bits are enabled only when the multicast bit is set. As noted above, the multicast bit may be set (along with the multicast addressing bits) selectively for each decoder level, permitting the operation to be multicast at one level and unicast at another. In addition, the individual multicast bits may allow multicast to be sent to any combination of the decoders at the next-lower hierarchy.

FIG. 9 shows an example implementation of decoder circuitry (at a given hierarchical stage) for the request data-path in a memory architecture supporting in-order execution, with highlighted circuitry illustrating an example set of modifications for the multicast support which requires few additional signals and gates leveraging most of the data-paths including wide buses. Thus, the same data path may be used for sequential memory read/write operations as are used for the multicast operations. In the example of FIG. 9, the decoder circuit uses the multicast activation bit and multicast addressing bits 910 to activate and address multicast functionality. To select between multicast or normal (unicast) addressing, a selector 900 (e.g., a mux) receives a signal that a request is present in the request FIFO (e.g., not-empty) and passes the not-empty signal to either an address selector for normal addressing or circuitry for multicast addressing. When a multicast request is present, the multicast bits are used to detect a 'ready' flag 920 passed up from the from required fan-outs if multicast mode is specified through the input signal. A multicast ready circuit 930 compares the set of ready flags 920 with the specified fan-outs in the multicast address bits 910, such that the multicast ready circuit 930 indicates the data is ready for multicasting when the fan-outs specified by the multicast address bits 910 are providing a ready signal 920. For multicast address bits which are off (e.g., a value of 0), the multicast ready circuit 930 may ignore the ready signal of the respective fan-out, checking only the ready signal for activated multicast address bits 910. When the multicast ready circuit 930 passes the signal through, the fan-outs are ready to receive the operation and the ready signal may be checked by circuit 940 to be passed to an address selector 950, which may activate a signal for each fan-out to activate the "request" signal via request circuit 960. In this embodiment, the "request" signal is generated conditionally to indicate to addressed fan-outs to receive the request passed from the current decoder, allowing the address, data buses and other sideband signals to be broadcast as in non-multicast environments. The multicast address bits 910 may be configured in various ways, such as through: 1) separate configuration interconnect fabric, 2) reusing the main interconnect fabric extending command opcodes to writing multicast bits, and 3) specified through additional side-band signals along with the request. The structure shown in FIG. 9 thus provides an effective means for multicasting data while also allowing for typical sequential read/write operations, for example by other components or devices using the hierarchical memory for memory read/write operations.

Figure 10:
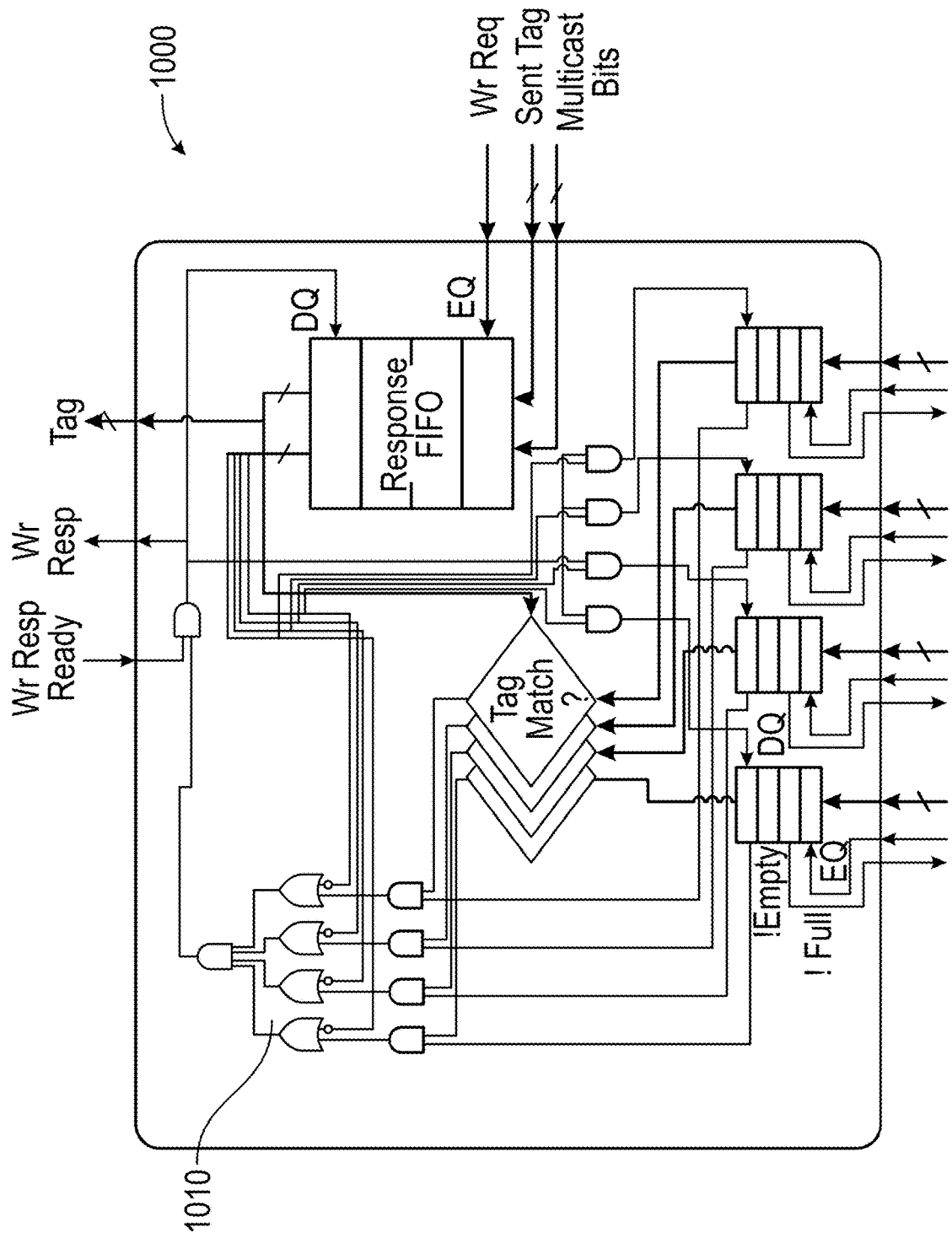
FIG. 10 shows an example circuit for a write response data-path with multicast support.

FIG. 10 shows an example circuit for a write response data-path with multicast support. Multicast address bits 1000 are stored in the response FIFO structure to match against expected response flags from its fan-outs (inner hierarchy) before raising a response flag to next outer hierarchy. In this example circuit, the write response data is modified to match response flats from at response matching circuit 1010. When a matching tag is received, the expected response is compared with the expected write request responses by the response matching circuit 1010. As shown, the address bits are used to identify which underlying write responses are expected, such that when the multicast address is zero, the response matching circuit 1010 provides a positive response, and when the multicast address is one, the response matching circuit 1010 requires a positive response from each of the corresponding fan-outs before providing its response upward. In addition, the successful write response from the decoder may thus consolidate the write response from the layers below the current decoder layer, permitting a single successful write response received by the controller to represent success of the full multicast write operation to the underlying targeted sub-arrays. In some embodiments, multicast support is provided for write data only, such that circuitry for read data response remains unmodified.

Programming of Multicast Bits

Figure 11:
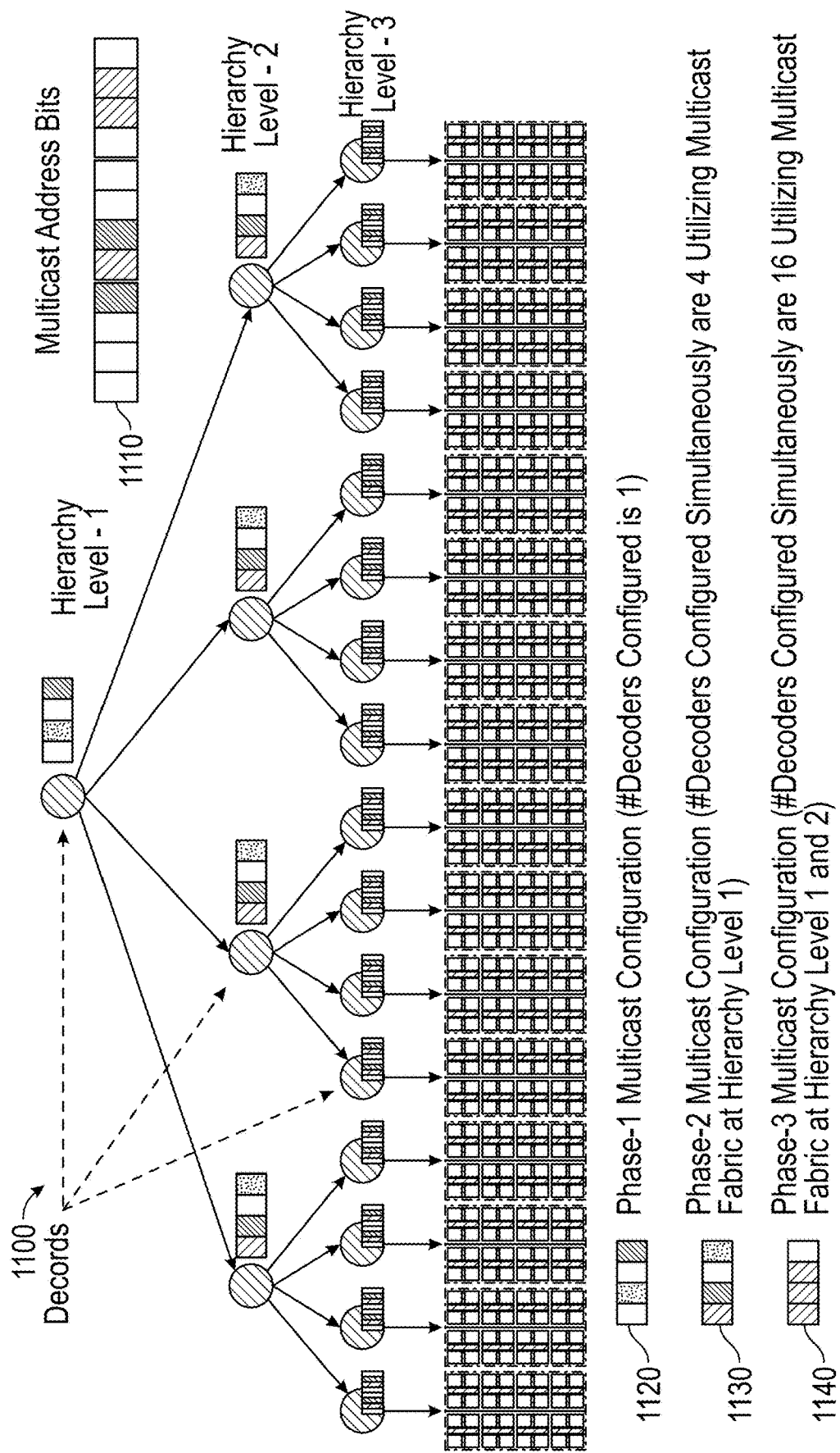
FIG. 11 show an example hierarchical programming of multicast configuration across all decoders in a given memory architecture.

FIG. 11 show an example hierarchical programming of multicast configuration across all decoders 1100 in a given memory architecture. In the example with 3 levels of decoder hierarchy, an entire multicast configuration completes in just 3 phases. In each phase, all decoders 1100 of a hierarchy level are programmed simultaneously utilizing broadcast fabric present in outer levels of hierarchy. Stated another way, the multicast configuration at lower hierarchy levels may use the same data received from higher hierarchy levels, such that the multicast address bits 1110 are invariant for the different decoders at the same different levels. For example, in this example, the multicast address bits 1110 for the multicast operation may include portions operable by decoders at different hierarchy levels. In a memory architecture with large number of sub-arrays, programming different multicast bits in decoder circuitry at each hierarchical stage for different decoders at the respective stage could significantly add to overall latency. By constraining multicast address bits to include the same multicast configuration for all decoders at a given hierarchy level, the address bits may be programmed hierarchically, such that the decoders receiving the phase 1 multicast configuration 1120 may then affect the next-level decoders receiving the multicast configuration 1130 and subsequently those receiving the multicast configuration 1140. Thus, in one embodiment, decoders at the same hierarchical level are programmed with the same multicast configuration. As such, the multicast configuration in the memory architecture may be provided simultaneously to each decoder at a hierarchy level. Similarly, the generation of a compute tiles and respective supertiles, along with relevant division of portions of data tiles (e.g., constraints for dividing data tiles across subarrays) any other workload processing considerations in generating supertiles and operations for executing the supertile and the workload (e.g., as performed by a compiler) may follow a constrained search space using this hierarchical programming.

Figure 12:
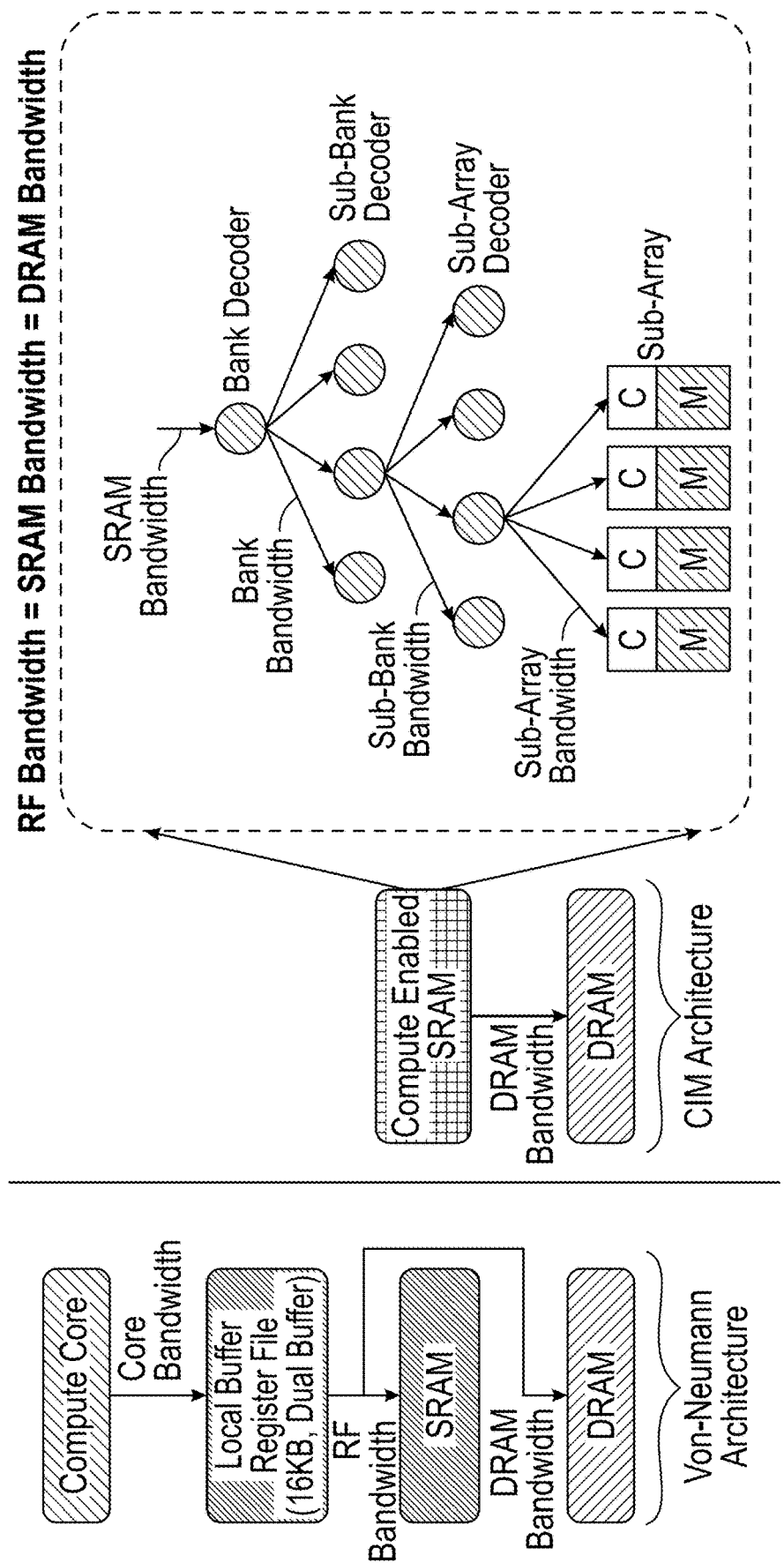
FIG. 12 shows an example setup for comparing the performance of a memory architecture with co-located processing circuits with multicast capability against an iso-compute architecture.

FIG. 12 shows an example setup for comparing the performance of a memory architecture with co-located processing circuits (here, with a compute-in-memory (CiM) architecture) with multicast capability against an iso-compute Von-Neumann architecture (discrete compute) according to one embodiment. For a fair comparison, the RF bandwidth and SRAM bandwidth are kept same as DRAM bandwidth to avoid unfair bandwidth bottlenecks. Also, the computing core bandwidth is assumed to be very high to attain highest possible execution efficiency with the Von-Neumann architecture. As a sample configuration, the disclosed memory architecture is built using 8 KB sub-array and a processing circuit per sub-array with 4 MAC (multiply-and-accumulate) operations/cycle of compute throughput. Link bandwidths connecting to sub-array, sub-bank, and bank is chosen to be 8 bytes/cycle. SRAM bandwidth and SRAM total capacity is varied to evaluate the co-located processing circuit (CIM) architecture (with multicast) against the Von-Neumann architecture. To vary the SRAM capacity #Banks, #Sub-banks per bank, and #Sub-arrays per sub-bank is varied (Table 1). The total compute throughput (in the CiM architecture) linearly scales with total memory size as sub-array size and compute throughput per sub-array is kept constant. Therefore, to compare with the Von-Neumann architecture and fairly evaluate the iso-compute efficacy, the Von-Neumann architecture is also scaled with SRAM capacity. Dataflow (tiling and loop-order) for both the CiM and Von-Neumann architecture is individually optimized to achieve their best performance.

The tests were performed by modeling memory architecture for data-transfer and cycle projection to estimate energy and performance improvements with CiM architecture as shown in FIG. 10 with architecture setup as described in FIG. 9 and Table 1.

TABLE 1

| Memory Size (MB) | #Banks | #Sub-banks | #Sub-Arrays |
| --- | --- | --- | --- |
| 2 | 8 | 8 | 4 |
| 4 | 16 | 8 | 4 |
| 8 | 16 | 8 | 8 |
| 16 | 16 | 8 | 16 |

Table 1 shows selected memory architecture configurations for performance and energy efficiency comparisons.

Figure 13:
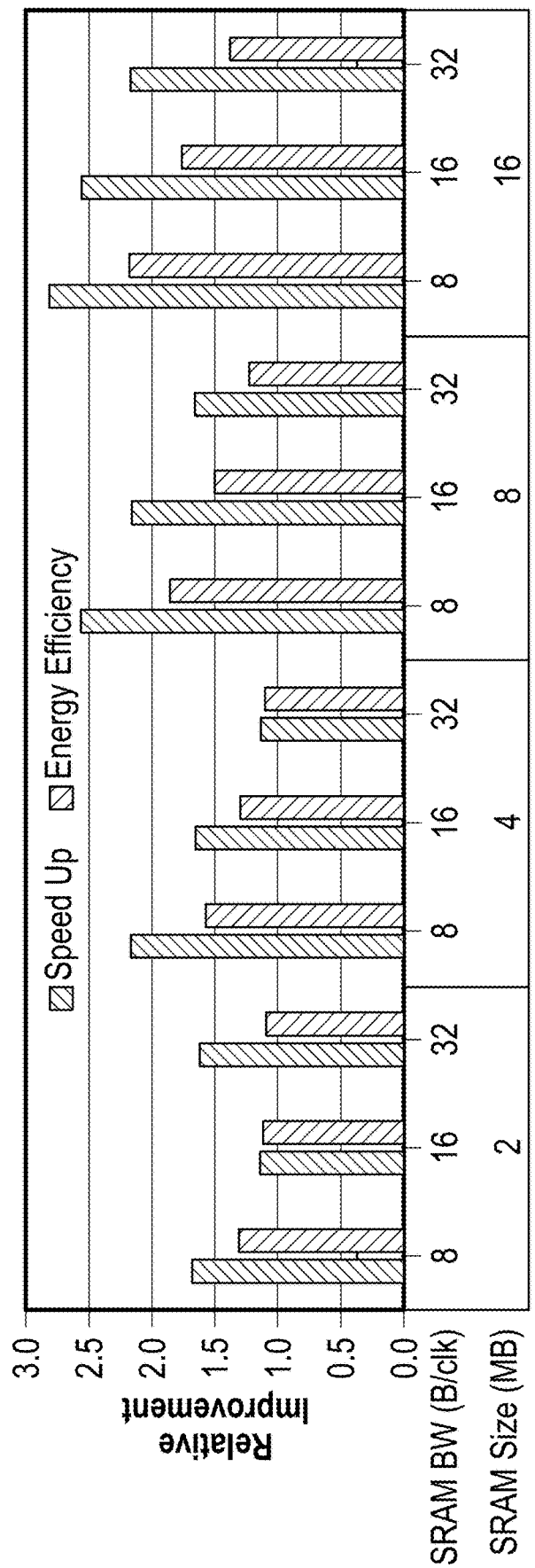
FIG. 13 shows speed-up and improvement in energy efficiency for an embodiment of a memory architecture with co-located processing circuits with multicast capability against an iso-compute architecture.

FIG. 13 shows speed-up and improvement in energy efficiency for an embodiment of CiM architecture (with multicast capability) as compared to Von-Neumann architecture over varying SRAM sizes and SRAM bandwidth points for the ResNet-50 inference workload, a benchmark NN inference workload.

Figure 14:
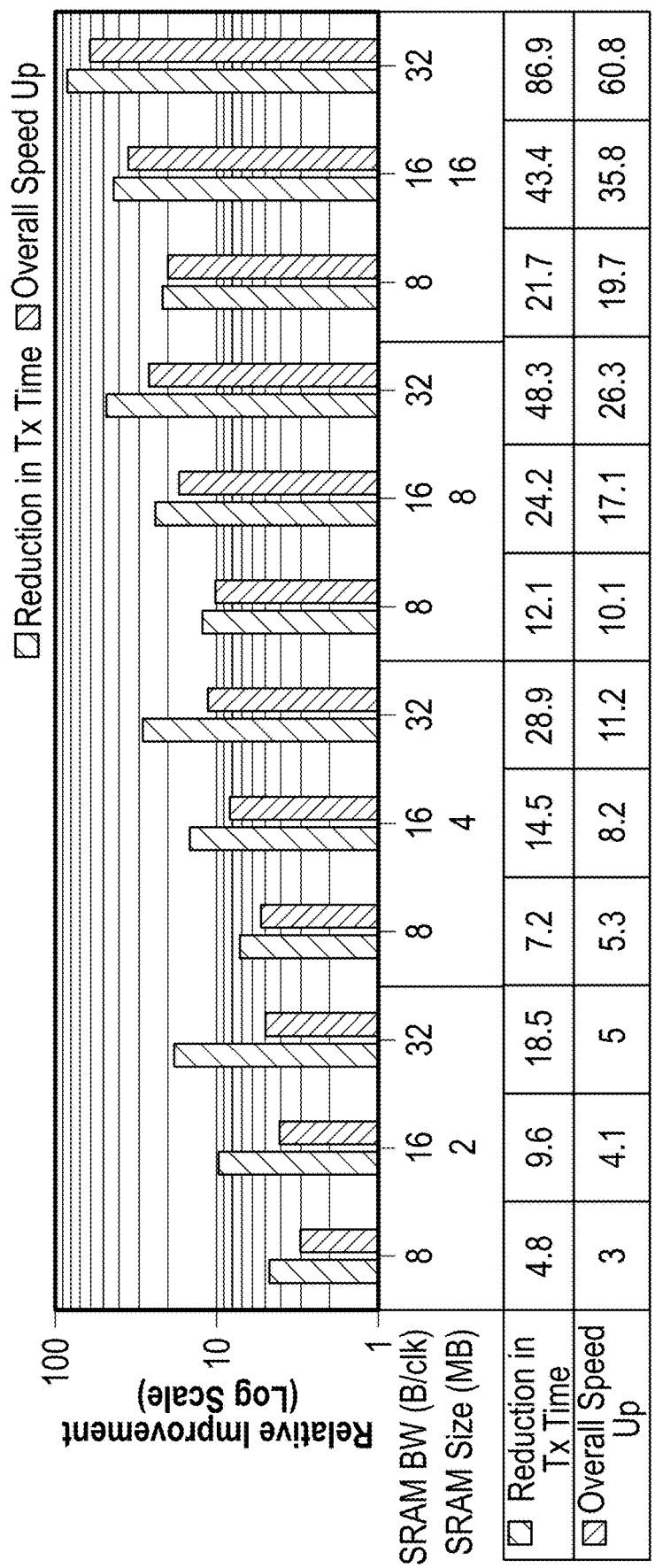
FIG. 14 shows the impact of multicast capability in decoder circuitry on data-transfer time and overall speed-up according to one embodiment.

FIG. 14 shows the impact of multicast capability in decoder circuitry on data-transfer time and overall speed-up according to one embodiment. As the memory architecture scales-up with a higher number of sub-arrays (i.e., each including a processing circuit), the multicast capability can exploit higher parallelism in data transfer. In this example, the baseline is a compute-in-memory (CiM) architecture/dataflow without multicast capability in decoder circuitry. FIG. 14 thus shows an evaluated impact of multicast capability in decoder circuitry that reduces data transfer time for the same set of architecture configurations.

Table 2 below shows the area impact of multicast capability:

TABLE 2

| Sub-Array Configuration (words, bit-width) | Hierarchy Levels | Memory Architecture (# Fan-outs per hierarchy) [Bank, SB, SA] | Synthesis Area (mm^2) | | |
|---|---|---|---|---|---|
| | | | w/o Multicast | w/ Multicast | % increase |
| (1024, 64) | 3 | [4, 4, 16] | 1.171 | 1.173 | 0.17% |
| (1024, 128) | 3 | [4, 4, 8] | 1.179 | 1.182 | 0.25% |
| (2048, 64) | 3 | [4, 4, 8] | 1.168 | 1.171 | 0.26% |
| (2048, 128) | 3 | [4, 4, 4] | 1.175 | 1.179 | 0.34% |

Table 2 shows initial data on the overall area impact due to multicast capability support in decoder circuitry across a few memory architecture configurations with 2 MB memory capacity.

As shown by the above experiments, for ResNet-50 inference, the sub-array-located processing circuits with multicast capability provides a speed-up of 1.6× and 2.8× over the experimental Von-Neumann architecture (architecturally and physically disjoint compute and memory) with iso-compute and iso-memory configuration for a SRAM memory capacity of 2 MB and 16 MB respectively. Additionally, these experiments also show that these memories may improve energy efficiency by 1.3× and 2.17× respectively.

Further, the hardware-software co-designed multicast capability when adopted in a compute-in-memory architecture enables 4.8× and 21.7× reduction in data-transfer time vs. the same architecture without the multicast capability for 2 MB and 16 MB memory configurations respectively. Overall, it provides a speed-up of 3.0× and 19.7× respectively. This highlights the importance of multicast capability in such sub-array co-located processing circuits (e.g., CiM/CnM architectures)

Example Devices

Figure 15:
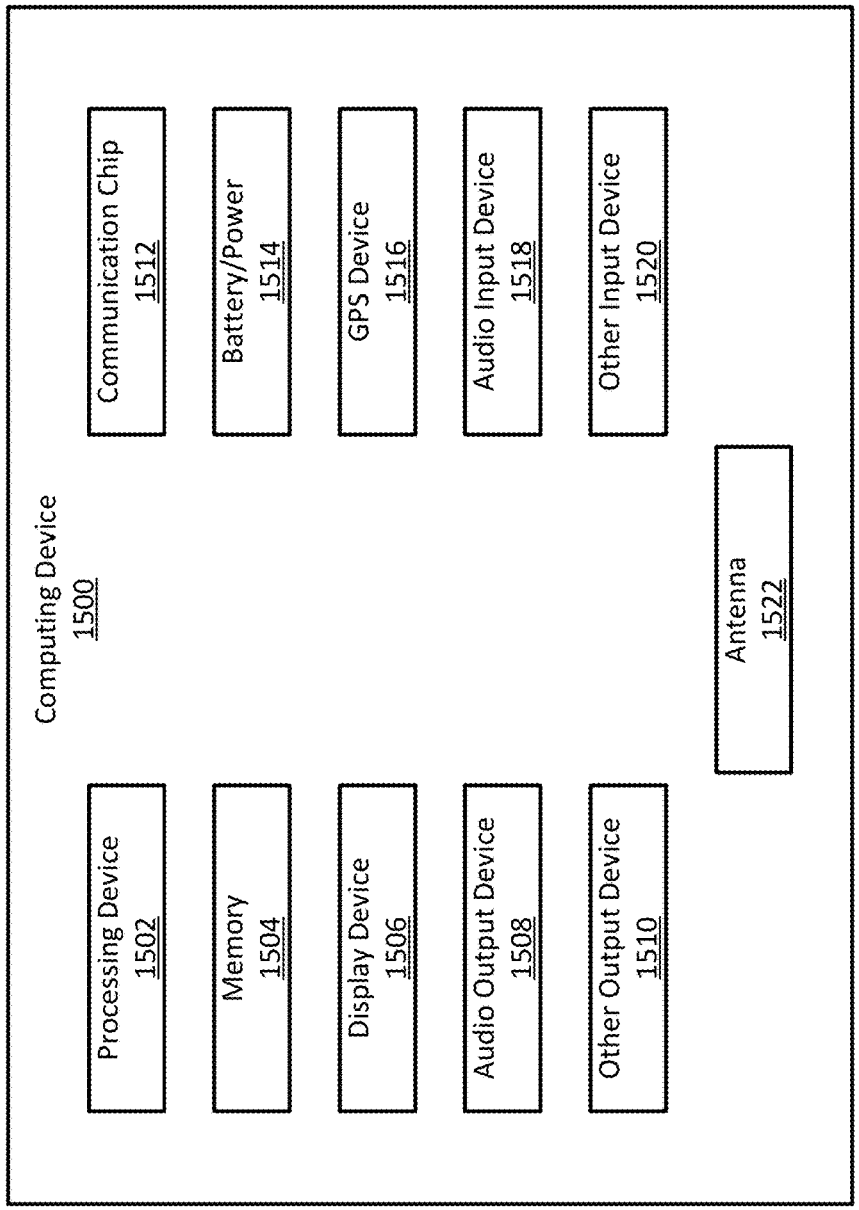
FIG. 15 is a block diagram of an example computing device that may include one or more components in accordance with any of the embodiments disclosed herein.

FIG. 15 is a block diagram of an example computing device 1500 that may include one or more components with hierarchical multicast for in-memory computation in accordance with any of the embodiments disclosed herein. For example, any suitable ones of the components of the computing device 1500 may include a hardware component (e.g., a processor, memory, configurable circuit or application-specific integrated circuit) configured with multicast characteristics as described herein.

A number of components are illustrated in FIG. 15 as included in the computing device 1500, but any one or more of these components may be omitted or duplicated, as suitable for the application. In some embodiments, some or all of the components included in the computing device 1500 may be attached to one or more motherboards. In some embodiments, some or all of these components are fabricated onto a single system-on-a-chip (SoC) die.

Additionally, in various embodiments, the computing device 1500 may not include one or more of the components illustrated in FIG. 15, but the computing device 1500 may include interface circuitry for coupling to the one or more components. For example, the computing device 1500 may not include a display device 1506, but may include display device interface circuitry (e.g., a connector and driver circuitry) to which a display device 1506 may be coupled. In another set of examples, the computing device 1500 may not include an audio input device 1518 or an audio output device 1508 but may include audio input or output device interface circuitry (e.g., connectors and supporting circuitry) to which an audio input device 1518 or audio output device 1508 may be coupled.

The computing device 1500 may include a processing device 1502 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1802 may include one or more digital signal processors (DSPs), application-specific ICs (ASICs), central processing units (CPUs), graphics processing units (GPUs), cryptoprocessors (specialized processors that execute cryptographic algorithms within hardware), server processors, or any other suitable processing devices. The computing device 1500 may include a memory 1504, which may itself include one or more memory devices such as volatile memory (e.g., dynamic random-access memory (DRAM)), nonvolatile memory (e.g., read-only memory (ROM)), flash memory, solid state memory, and/or a hard drive. The memory 1104 may include instructions executable by the processing device for performing methods and functions as discussed herein. Such instructions may be instantiated in various types of memory, which may include non-volatile memory and as stored on one or more non-transitory mediums. In some embodiments, the memory 1504 may include memory that shares a die with the processing device 1502. This memory may be used as cache memory and may include embedded dynamic random-access memory (eDRAM) or spin transfer torque magnetic random-access memory (STT-MRAM).

In some embodiments, the computing device 1500 may include a communication chip 1512 (e.g., one or more communication chips). For example, the communication chip 1512 may be configured for managing wireless communications for the transfer of data to and from the computing device 1500. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1512 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1512 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. The communication chip 1512 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1512 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1512 may operate in accordance with other wireless protocols in other embodiments. The computing device 1500 may include an antenna 1522 to facilitate wireless communications and/or to receive other wireless communications (such as AM or FM radio transmissions).

In some embodiments, the communication chip 1512 may manage wired communications, such as electrical, optical, or any other suitable communication protocols (e.g., the Ethernet). As noted above, the communication chip 1512 may include multiple communication chips. For instance, a first communication chip 1512 may be dedicated to shorter-range wireless communications such as Wi-Fi or Bluetooth, and a second communication chip 1512 may be dedicated to longer-range wireless communications such as global positioning system (GPS), EDGE, GPRS, CDMA, WiMAX, LTE, EV-DO, or others. In some embodiments, a first communication chip 1512 may be dedicated to wireless communications, and a second communication chip 1512 may be dedicated to wired communications.

The computing device 1500 may include battery/power circuitry 1514. The battery/power circuitry 1514 may include one or more energy storage devices (e.g., batteries or capacitors) and/or circuitry for coupling components of the computing device 1500 to an energy source separate from the computing device 1500 (e.g., AC line power).

The computing device 1500 may include a display device 1506 (or corresponding interface circuitry, as discussed above). The display device 1506 may include any visual indicators, such as a heads-up display, a computer monitor, a projector, a touchscreen display, a liquid crystal display (LCD), a light-emitting diode display, or a flat panel display, for example.

The computing device 1500 may include an audio output device 1508 (or corresponding interface circuitry, as discussed above). The audio output device 1508 may include any device that generates an audible indicator, such as speakers, headsets, or earbuds, for example.

The computing device 1500 may include an audio input device 1518 (or corresponding interface circuitry, as discussed above). The audio input device 1518 may include any device that generates a signal representative of a sound, such as microphones, microphone arrays, or digital instruments (e.g., instruments having a musical instrument digital interface (MIDI) output).

The computing device 1500 may include a GPS device 1516 (or corresponding interface circuitry, as discussed above). The GPS device 1516 may be in communication with a satellite-based system and may receive a location of the computing device 1500, as known in the art.

The computing device 1500 may include an other output device 1510 (or corresponding interface circuitry, as discussed above). Examples of the other output device 1510 may include an audio codec, a video codec, a printer, a wired or wireless transmitter for providing information to other devices, or an additional storage device.

The computing device 1500 may include an other input device 1520 (or corresponding interface circuitry, as discussed above). Examples of the other input device 1520 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 1500 may have any desired form factor, such as a hand-held or mobile computing device (e.g., a cell phone, a smart phone, a mobile internet device, a music player, a tablet computer, a laptop computer, a netbook computer, an ultrabook computer, a personal digital assistant (PDA), an ultramobile personal computer, etc.), a desktop computing device, a server or other networked computing component, a printer, a scanner, a monitor, a set-top box, an entertainment control unit, a vehicle control unit, a digital camera, a digital video recorder, or a wearable computing device. In some embodiments, the computing device 1500 may be any other electronic device that processes data.

Select Examples

The following paragraphs provide various examples of the embodiments disclosed herein.

Example 1 provides for a memory circuit including multicast capability for co-located computing, including: a controller configured to receive operational requests that include a set of multicast addressing bits; a plurality of memory cells organized in a plurality of subarrays each including one or more memory cells and a processing circuit, each processing circuit configured to perform compute operations with the one or more memory cells in the respective subarray; and a plurality of decoders arranged in a plurality of hierarchical levels configured to receive an operational request from the controller and route the memory request to the subarrays, the plurality of hierarchical decoders including a decoder at a first hierarchical level configured to route the request to a group of decoders at a lower hierarchical level based on at least a portion of the set of multicast addressing bits received at the decoder.

Example 2 provides for the memory circuit of claim 1, wherein the processing circuit is a compute-near-memory (CnM) or compute-in-memory (CiM) architecture.

Example 3 provides for the memory circuit of claim 1 or 2, wherein the first hierarchical level includes another decoder that receives the portion of multicast bits and routes the request to another group of decoders at the lower hierarchical level based on the portion of multicast bits.

Example 4 provides for the memory circuit of any of claims 1-3, wherein the operational request includes a compute instruction that is routed to more than one memory array based on the multi-cast bits.

Example 5 provides for the memory circuit of any of claims 1-4, wherein the processing circuits of the plurality of the sub-arrays are configured to execute a compute instruction in parallel.

Example 6 provides for the memory circuit of any of claims 1-5, wherein a top level of the hierarchical levels includes one decoder that receives operational requests from the controller.

Example 7 provides for the memory circuit of any of claims 1-6, wherein the operational request includes a set of address bits and a multicast activation bit; wherein the plurality of decoders are configured to, when the multicast activation bit is off, route the memory request to a sub-array, in the plurality of memory arrays, corresponding to an address of the set of address bits.

Example 8 provides for the memory circuit of claim 7, wherein the decoder is configured to route the request to a group of decoders based on the set of multicast address bits when the multicast activation bit is on.

Example 9 provides for a method for performing compute operations with a memory architecture a plurality of memory cells organized into a plurality of subarrays addressable by hierarchical multicast addressing at a plurality of hierarchy levels, each subarray including a co-located processing circuit configured to perform compute operations with the associated subarray, the method including: identifying a compute supertile including an operation to be performed on a first data supertile of first data tiles and a second data supertile of second data tiles, the compute supertile including a plurality of compute tiles equaling a number of subarrays in the plurality of subarrays; during a data transfer phase, transferring the first data supertile and the second data supertile with a plurality of operational requests that multicast the first data tiles and the second data tiles with multicast addressing bits at one or more hierarchy levels of the memory architecture to the plurality of subarrays, such that each subarray receives a unique combination of first data tile and second data tile; and during a compute phase, performing the operation in parallel with the plurality of subarrays each operating on the respective unique combination of first data tile and second data tile.

Example 10 provides for the method of claim 9 in which the first data supertile is input feature map data tiles and the second data supertile is input channel weight data tiles.

Example 11 provides for the method of claim 10, in which each input feature map data tile corresponds to a chunk of spatial input and a chunk of input channels; and each input channel weight data tile corresponds to a chunk of output channel weights for a chunk of input channels.

Example 12 provides for the method of claim 11, wherein a multicasting fan-out of the data tiles at a hierarchy level of the memory architecture is determined by the number of decoders or subarrays below the hierarchy level in the memory architecture.

Example 13 provides for the method of any of claims 9-12, wherein the multicast addressing bits for each of the operational requests of the plurality of operational requests includes the same multicast addressing bits to be applied to all fan-outs at a hierarchical level.

Example 14 provides for the method of any of claims 9-13, wherein the compute supertile is at least a portion of a layer of a neural network.

Example 15 provides for the method of claim 14, wherein identifying the compute supertile comprises optimizing a tile size or a loop order for processing tiles of the portion of the layer of the neural network.

Example 16 provides for the method of claim 14 or 15, wherein identifying the compute supertile comprises selecting the compute supertile based on an evaluation of a plurality of partitioned compute supertiles based on a number of the plurality of subarrays in the memory architecture.

Example 17 provides for the method of any of claims 9-16, further comprising determining a size for the first data tiles or the second data tiles based on the size of the sub-array.

Example 18 provides for a non-transitory computer-readable storage medium for performing compute operations with a memory architecture having a plurality of memory cells organized into a plurality of subarrays addressable by hierarchical multicast addressing at a plurality of hierarchy levels, each subarray including a co-located processing circuit configured to perform compute operations with the associated subarray, the non-transitory compute-readable storage medium containing instructions for: identifying a compute supertile including an operation to be performed on a first data supertile of first data tiles and a second data supertile of second data tiles, the compute supertile including a plurality of compute tiles equaling a number of subarrays in the plurality of subarrays; during a data transfer phase, transferring the first data supertile and the second data supertile with a plurality of operational requests that multicast the first data tiles and the second data tiles with multicast addressing bits at one or more hierarchy levels of the memory architecture to the plurality of subarrays, such that each subarray receives a unique combination of first data tile and second data tile; and during a compute phase, performing the operation in parallel with the plurality of subarrays each operating on the respective unique combination of first data tile and second data tile.

Example 19 provides for the non-transitory computer-readable storage medium of claim 18 in which the first data supertile is input feature map data tiles and the second data supertile is input channel weight data tiles.

Example 20 provides for the non-transitory computer-readable storage medium of claim 19, in which each input feature map data tile corresponds to a chunk of spatial input and a chunk of input channels; and each input channel weight data tile corresponds to a chunk of output channel weights for a chunk of input channels.

Example 21 provides for the non-transitory computer-readable storage medium of claim 20, wherein a multicasting fan-out of the data tiles at a hierarchy level of the memory architecture is determined by the number of decoders or subarrays below the hierarchy level in the memory architecture.

Example 22 provides for the non-transitory computer-readable storage medium of any of claims 18-21, wherein the multicast addressing bits for each of the operational requests of the plurality of operational requests includes the same multicast addressing bits to be applied to all fan-outs at a hierarchical level.

Example 23 provides for the non-transitory computer-readable storage medium of any of claims 18-22, wherein the compute supertile is at least a portion of a layer of a neural network.

Example 24 provides for the non-transitory computer-readable storage medium of claim 23, wherein identifying the compute supertile comprises optimizing a tile size or a loop order for processing tiles of the portion of the layer of the neural network.

Example 25 provides for the non-transitory computer-readable storage medium of claim 23 or 24, wherein identifying the compute supertile comprises selecting the compute supertile based on an evaluation of a plurality of partitioned compute supertiles based on a number of the plurality of subarrays in the memory architecture.

Example 26 provides for the non-transitory computer-readable storage medium of any of claim 18-25, the instructions further being for determining a size for the first data tiles or the second data tiles based on the size of the sub-array.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

What is claimed is:

1. A memory circuit including multicast capability for co-located computing, comprising:
   a controller configured to receive an operational request that includes a set of multicast addressing bits;
   a plurality of memory cells organized in a plurality of subarrays, a subarray of the plurality of subarrays including one or more memory cells and a processing circuit, the processing circuit configured to perform compute operations with the one or more memory cells in the subarray; and
   a plurality of decoders arranged in a plurality of hierarchical levels, the plurality of decoders configured to receive the operational request from the controller and to route the operational request to the plurality of subarrays, the plurality of decoders including a decoder at a first hierarchical level, the decoder configured to route the operational request to a group of decoders at a lower hierarchical level based on at least a portion of the set of multicast addressing bits.

2. The memory circuit of claim 1, wherein the processing circuit is a compute-near-memory (CnM) or compute-in-memory (CiM) architecture processing circuit.

3. The memory circuit of claim 1, wherein the first hierarchical level includes another decoder that is to receive the portion of the set of multicast addressing bits and to route the operational request to another group of decoders at the lower hierarchical level based on the portion of the set of multicast addressing bits.

4. The memory circuit of claim 1, wherein the operational request further includes a compute instruction that is to be routed to more than one subarray of the plurality of subarrays based on the portion of the set of multicast addressing bits.

5. The memory circuit of claim 1, wherein processing circuits of the plurality of the subarrays are configured to execute a compute instruction in parallel.

6. The memory circuit of claim 1, wherein a top level of the hierarchical levels includes one decoder that receives the operational request from the controller.

7. The memory circuit of claim 1, wherein the operational request further includes a multicast activation bit; wherein the plurality of decoders are configured to, when the multicast activation bit is off, route the operational request to a first subarray of the plurality of subarrays, corresponding to an address of the set of multicast addressing bits.

8. The memory circuit of claim 7, wherein the decoder is configured to route the operational request to the group of decoders further based on the multicast activation bit.

* * * * *